United States Patent
Olabi et al.

(10) Patent No.: US 11,600,453 B1
(45) Date of Patent: Mar. 7, 2023

(54) ALL TRANSITION METAL SELENIDE COMPOSED HIGH-ENERGY SOLID-STATE HYBRID SUPERCAPACITOR

(71) Applicant: University of Sharjah, Sharjah (AE)

(72) Inventors: Abdul Ghani Olabi, Sharjah (AE); Mohammad Abdelkareem, Sharjah (AE); Pragati Ankush Shinde, Sharjah (AE); Nilesh R. Chodankar, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 17/583,828

(22) Filed: Jan. 25, 2022

(51) Int. Cl.
*H01G 11/30* (2013.01)
*H01G 11/86* (2013.01)
*H01G 11/24* (2013.01)
*H01G 11/04* (2013.01)

(52) U.S. Cl.
CPC ............ *H01G 11/30* (2013.01); *H01G 11/04* (2013.01); *H01G 11/24* (2013.01); *H01G 11/86* (2013.01)

(58) Field of Classification Search
CPC ......... H01G 11/30; H01G 11/04; H01G 11/24
See application file for complete search history.

(56) References Cited

FOREIGN PATENT DOCUMENTS

| | | | |
|---|---|---|---|
| CN | 110304612 A | * | 10/2019 |
| EP | 0078404 A2 | * | 11/1983 |

OTHER PUBLICATIONS

P. Simon, "Where do batteries end and supercapacitors begin?", Journal, 2014, 1210-1211, vol. 343, Science.
M. Winter, "What are batteries, fuel cells, and supercapacitors?", Journal, 2004, 4245-4270, vol. 104, Chemical Reviews.
J. Zhang, "A high-performance asymmetric supercapacitor fabricated with graphene-based electrodes", Journal, 2011, 4006-4015, vol. 4, Energy & Environmental Science.
H. Liu, "Transition metal based battery-type electrodes in hybrid supercapacitors: a review", Journal, 2020, 122-145, vol. 28, Energy Storage Materials.

(Continued)

*Primary Examiner* — Eric W Thomas
(74) *Attorney, Agent, or Firm* — Hayes Soloway PC

(57) ABSTRACT

There is disclosed a method and a system for a versatile in-situ approach to design the nanostructured transition metal selenide (TMS) materials for the high-energy solid-state hybrid supercapacitors (HSCs). Initially, the rose-nanopetals like NiSe@Cu2Se (NiCuSe) cathode and FeSe nanoparticles anode are directly anchored on 3D highly conducting Cu foam via purposefully in-situ conversion reactions. The different potential windows of the NiCuSe and FeSe in aqueous electrolytes associated with the excellent electrical conductivity and redox activity results in the superior electrochemical features for the half cell with maximum specific capacity of 534.2 mA h $g^{-1}$ for NiCuSe and 573.8 mA h $g^{-1}$ for FeSe at current density of 1 A $g^{-1}$, respectively. The solid-state HSC cell with NiCuSe cathode and FeSe anode delivers a highest specific energy of 87.6 Wh $kg^{-1}$ and excellent cycle lifetime with capacity retention of 91.3% over 10,000 cycles.

12 Claims, 29 Drawing Sheets

(56) References Cited

OTHER PUBLICATIONS

Y. Liu, "Design of Hierarchical Ni—Co@ Ni—Co Layered Double Hydroxide Core-Shell Structured Nanotube Array for High-Performance Flexible All-Solid-State Battery-Type Supercapacitors", Journal, 2017, 1-11, vol. 27, Advanced Functional Materials.
J. Sun, "Bundlelike CuCo2O4 microstructures assembled with ultrathin nanosheets as battery-type electrode materials for high-performance hybrid supercapacitors", Journal, 2020, 8026-8037, vol. 3, ACS Applied Energy Materials.
T.S. Mathis, "Energy storage data reporting in perspective—guidelines for interpreting the performance of electrochemical energy storage systems", Journal, 2017, 1-13, vol. 9, Advanced Energy Materials.
Y. W. Lee, "Hierarchically assembled tubular shell-core-shell heterostructure of hybrid transition metal chalcogenides for high-performance supercapacitors with ultrahigh cyclability", Journal, 2017, 15-23, vol. 37, Nano Energy.
T. Wang, "Boosting the cycling stability of transition metal compounds-based supercapacitors", Journal, 2019, 545-573, vol. 16, Energy Storage Materials.
Y. Zhang, "Self-templated synthesis of N-doped CoSe2/C double-shelled dodecahedra for high-performance supercapacitors", Journal, 2017, 28-34, vol. 8, Energy Storage Materials.
T. Lu, "Fabrication of transition metal selenides and their applications in energy storage", Journal, 2017, 75-99, vol. 332, Coordination Chemistry Reviews.
C.P. Yang, "An advanced selenium-carbon cathode for rechargeable lithium-selenium batteries", Journal, 2013, 8363-8367, vol. 52, Angewandte chemie international edition.
A. Chang, "Plasma-assisted synthesis of NiSe2 ultrathin porous nanosheets with selenium vacancies for supercapacitor", Journal, 2018, 41861-41865, vol. 10, ACS Applied Materials & Interfaces.
P. Pazhamalai, "Hierarchical copper selenide nanoneedles grown on copper foil as a binder free electrode for supercapacitors", Journal, 2016, 14830-14835, vol. 41, International Journal of Hydrogen Energy.
C. Tang, "In situ growth of nise nanowire film on nickel foam as an electrode for high-performance supercapacitors", Journal, 2015, 1903-1907, vol. 2, ChemElectroChem.
C. Wang, "Metallic few-layered VSe 2 nanosheets: high two-dimensional conductivity for flexible in-plane solid-state supercapacitors", Journal, 2018, 8299-8306, vol. 6, Journal of Materials Chemisty A.
Z.B. Zhai, "Superior mixed Co—Cd selenide nanorods for high performance alkaline battery-supercapacitor hybrid energy storage", Journal, 2018, 89-95, vol. 47, Nano Energy.
Y.A Dakka, "Advanced Cu0. 5Co0. 5Se2 nanosheets and MXene electrodes for high-performance asymmetric supercapacitors", Journal, 2020, 1-11, vol. 385, Chemical Engineering Journal.
A. Li, "Mixed Cu2Se Hexagonal Nanosheets@ Co3Se4 Nanospheres for High-Performance Asymmetric Supercapacitors", Journal, 2021, 10134-10141, vol. 27, Chemistry—A European Journal.
M.D. Khan, "Controlled synthesis of Sb2 (S1-x Se x) 3 (0≤ x≤ 1) solid solution and the effect of composition variation an electrocatalytic energy conversion and storage", Journal, 2020, 1448-1460, vol. 3, ACS Applied Energy Materials.
L.L. Zhang, "Carbon-based materials as supercapacitor electrodes", Journal, 2009, 2520-2531, vol. 28, Chemical Society Reviews.
A. Borenstein, "Carbon-based composite materials for supercapacitor electrodes: a review", Journal, 2017, 12653-12672, vol. 5, Journal of Materials Chemistry A.
B. Li, "Nitrogen-doped activated carbon for a high energy hybrid supercapacitor", Journal, 2016, 102-106, vol. 9, Energy & Environmental Science.
H. Fan, "1D to 3D hierarchical iron selenide hollow nanocubes assembled from FeSe2@ C core-shell nanorods for advanced sodium ion batteries", Journal, 2018, 48-55, vol. 10, Energy Storage Materials.

A. Pramanik, "Reduced graphene oxide anchored Cu (OH) 2 as a high performance electrochemical supercapacitor", Journal, 2015, 14604-14612, vol. 44, Dalton Transactions.
S. Zhu, "Hierarchical Cu (OH) 2@ Ni 2 (OH) 2 CO 3 core/shell nanowire arrays in situ grown on three-dimensional copper foam for high-performance solid-state supercapacitors", Journal, 2017, 9960-9969, vol. 5, Journal of Materials Chemistry A.
Y. Liu, "Zn—Ni—Co trimetallic carbonate hydroxide nanothorns branched on Cu (OH) 2 nanorods array based on Cu foam for high-performance asymmetric supercapacitors", Journal, 2019, 1-9, vol. 437, Journal of Power Sources.
C. Xia, "Asymmetric supercapacitors with metal-like ternary selenides and porous graphene electrodes", Journal, 2016, 78-86, vol. 24, Nano Energy.
Y. Zhao, "Amorphous MoSx nanoparticles grown on cobalt-iron-based needle-like array for high-performance flexible asymmetric supercapacitor", Journal, 2021, 1-9, vol. 417, Chemical Engineering Journal.
K. Wang, "Fe-Based Coordination Polymers as Battery-Type Electrodes in Semi-Solid-State Battery—Supercapacitor Hybrid Devices", Journal, 2021, 15315-15323, vol. 13, ACS Applied Materials & Interfaces.
X. Mao, "Phase-pure FeSe x (x= 1, 2) nanoparticles with one-and two-photon luminescence", Journal, 2014, 7189-7192, vol. 136, Journal of the American Chemical Society.
K. Xu, "Solution-Liquid-Solid Synthesis of Hexagonal Nickel Selenide Nanowire Arrays with a Nonmetal Catalyst", Journal, 2016, 1710-1713, vol. 55, Angewandte Chemie International Edition.
F. Jia, "Sb-Triggered β-to-α Transition: Solvothermal Synthesis of Metastable α-Cu2Se", Journal, 2014, 15941-15946, vol. 20, Chemistry—A European Journal.
C. Wang, "Ni—Co selenide nanowires supported on conductive wearable textile as cathode for flexible battery-supercapacitor hybrid devices", Journal, 2020, 1-10, vol. 400, Chemical Engineering Journal.
R. Gao, "Breaking Trade-Off between Selectivity and Activity of Nickel-Based Hydrogenation Catalysts by Tuning Both Steric Effect and d-Band Center", Journal, 2019, 1-10, vol. 6, Advanced Science.
L. Mi, "Ag+ insertion into 3D hierarchical rose-like Cu 1.8 Se nanocrystals with tunable band gap and morphology genetic", Journal, 2014, 1124-1133, vol. 6, Nanoscale.
P.A. Shinde, "Hierarchically designed 3D Cu3N@ Ni3N porous nanorod arrays: An efficient and robust electrode for high-energy solid-state hybrid supercapacitors", Journal, 2021, 1-11, vol. 22, Applied Materials Today.
S. Prabhakaran, "Hierarchical 3D oxygenated cobalt molybdenum selenide nanosheets as robust trifunctional catalyst for water splitting and zinc-air batteries", Journal, 2020, 1-13, vol. 16, Small.
X. Li, "(Ni, Co) Se2/NiCo-LDH Core/Shell Structural Electrode with the Cactus-Like (Ni, Co) Se2 Core for Asymmetric Supercapacitors", Journal, 2019, 1-10, vol. 15, Small.
G.D. Park, "Na-ion storage performances of FeSe x and Fe 2 O 3 hollow nanoparticles-decorated reduced graphene oxide balls prepared by nanoscale Kirkendall diffusion process", Journal, 2016, 1-10, vol. 6, Scientific Reports.
Q. Zheng, "Microwave synthesis of high activity FeSe2/C catalyst toward oxygen reduction reaction", Journal, 2015, 1079-1091, vol. 5, Catalysts.
Y. Tian, "Controllable growth of NiSe nanorod arrays via one-pot hydrothermal method for high areal-capacitance supercapacitors", Journal, 2017, 327-334, vol. 250, Electrochimica Acta.
Y. Zhu, "One-pot hydrothermal synthesis of 3D Cu2Se/CoSe composite as a novel battery-type cathode material with enhanced capacitive properties", Journal, 2021, 1-10, vol. 866, Journal of Alloys and Compounds.
P.A. Shinde, "Temperature dependent surface morphological modifications of hexagonal WO3 thin films for high performance supercapacitor application", Journal, 2017, 397-404, vol. 224, Electrochimica Acta.
S. Liu, "Structural engineering and surface modification of MOF-derived cobalt-based hybrid nanosheets for flexible solid-state supercapacitors", Journal, 2020, 167-177, vol. 32, Energy Storage Materials.

(56) References Cited

OTHER PUBLICATIONS

C. Zhang, "Two-dimensional tin selenide nanostructures for flexible all-solid-state supercapacitors", Journal, 2014, 3761-3770, vol. 8, ACS Nano.

P.A. Shinde, "All-redox solid-state supercapacitor with cobalt manganese oxide@ bimetallic hydroxides and vanadium nitride@ nitrogen-doped carbon electrodes", Journal, 2021, 1-13, vol. 405, Chemical Engineering Journal.

N.R. Chodankar, "Potentiodynamic polarization assisted phosphorus-containing amorphous trimetal hydroxide nanofibers for highly efficient hybrid supercapacitors", Journal, 2020, 5721-5733, vol. 8, Journal of Materials Chemistry A.

C. Lu, "Interface design based on Ti3C2 MXene atomic layers of advanced battery-type material for supercapacitors", Journal, 2020, 472-482, vol. 26, Energy Storage Materials.

L. Hou, "Monodisperse metallic NiCoSe2 hollow sub-microspheres: formation process, intrinsic charge-storage mechanism, and appealing pseudocapacitance as highly conductive electrode for electrochemical supercapacitors", Journal, 2018, 1-12, Advanced Functional Materials.

H. Peng, "High-performance asymmetric supercapacitor designed with a novel NiSe@ MoSe2 nanosheet array and nitrogen-doped carbon nanosheet", Journal, 2017, 5951-5963, vol. 5, ACS Sustainable Chemistry & Engineering.

A.M. Zardkhoshoui, "Construction of complex copper-cobalt selenide hollow structures as an attractive battery-type electrode material for hybrid supercapacitors", Journal, 2020, 1-11, vol. 402, Chemical Engineering Journal.

\* cited by examiner

ALL TRANSITION METAL SELENIDE COMPOSED HIGH-ENERGY SOLID-STATE HYBRID SUPERCAPACITOR

FIELD OF THE INVENTION

The present invention relates to a method and system for the synthesis of a high-energy solid-state hybrid-supercapacitor electrode material from transition metal selenide material.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Supercapacitors (SCs) are attracting considerable research interest as high-performance energy storage devices that can contribute to the rapid growth in many industries. The supercapacitors (SCs) will be playing a leading role in energy storing field anticipated to their valuable features of rapid charge-discharge rates, high power, prolonged cycle lifetime and safety tolerance. Among the different fabrication procedure of SCs, solid-state hybrid SCs (HSCs) are gaining much attention, as they avoid the electrolyte leakage problem which occur in traditional aqueous electrolyte based SCs. Yet, the real-life applications of the SCs are limited owing to their low energy density value resulted from the traditional surface capacitive charge storage mechanism. Massive research endeavors have been committed to developing narrative battery-type materials with faradaic charge storage for high energy SCs combining salient features of both batteries and SCs. Until now, inexpensive transition metal oxide/hydroxides with different structures and morphologies are developed as feasible battery-type electrode materials. Despite this, the major limitations associated with these p-type semiconductor electrode materials are their low electrical conductivity and poor cycling capability. Moreover, the polarization phenomenon of these materials hamper the electron transportation leading to inadequate rate capability, slow ion diffusion, sluggish electron transfer through the active material. Therefore, it is highly challenging, and yet enormously impactful to chase decent electrode materials having high electric conductivity and rate capability to tackle the inadequacy of transition metal oxide/hydroxide-based electrodes towards enhanced SCs performance.

One of the leading class of important functional materials is 2D transition metal chalcogenides (TMDs) which demonstrates unique electronic structures and physical properties because of their distinct geometric structures having weak interlayer van de Waals coupling. Different compositions and rich phase structure provides library of materials for potential applications in energy storage devices. The transition metal selenides (TMSs) are emerging class of typical TMDs and potential candidates for SCs owing to their lower band gap, excellent electric conductivity and superior electrochemical performance. Due to the presence of interstitial selenium, structure of TMSs can be properly modulated to enable rapid electron transport, which significantly lower the energy barrier for improving electrochemical performance Specifically, selenium belongs to the same group as oxygen and sulfur in a periodic table and shows excellent metal like and inherent electric properties than those of S with higher electric conductivity Se (Se, $1 \times 10-3$ S m-1) than S (S, $5 \times 10-28$ S m-1). In particular, $Cu_2Se$ nanoneedles, NiSe nanowires, and $VSe_2$ nanosheets are reported as excellent electrodes for SCs. State-of-the-art, most extensive research on TMNs has compensate quiet interest to design binary compounds by regulating the electronic structure of single TMNs for achieving better electrochemical performance. For instance, different studies reported $Cu_{0.5}Co_{0.5}Se_2$ nanosheets, which showed high specific capacitance of 1695 F g-1. Further, another study, owing to the synergy of different elements, the $Cu_2Se@Co_3Se_4$ electrode demonstrated highest specific capacitance of 1005 F g-1 at 1 A g-1, with rate performance of 56%.

Despite this success, phase-controlled synthesis of TMNs remains challenge as the composition or phase of these materials changes frequently during synthesis. Thus, developing a proper approach for the fabrication of highly appropriate self-supported TMNs with good electrochemical performance is current prerequisite. Additionally, in comparison to the positive electrode materials, the latest negative electrode materials for SC are rarely explored. Usually, carbon-based materials are suitable choice and extensively explored as negative electrodes for most of the HSCs devices. However, the serious problem with carbon-based anode is that the fabricated device could not provide a high energy density because of their low capacitance (as, $E = \frac{1}{2} CV^2$), which restricted the application of SCs in many areas. Therefore, investigating innovative category of negative electrode materials with higher capacitance to boost the energy density limits of present SCs is necessary. Most recently, iron-based materials are discovered for HSCs as an intriguing negative electrode.

SUMMARY OF THE INVENTION

Therefore it is an object of the present invention to develop a simple scale-up, solvothermal procedure to persistently synthesize $NiSe@Cu_2Se$ (denoted as NiCuSe) rose-petal structures and FeSe nanoparticles as battery-type electrodes for HSCs.

There is disclosed a hybrid super-capacitor (HSC) cell comprising a negative electrode made up of FeSe nanoparticles, a positive electrode made up of rose-nanopetals; and a copper foam; wherein the negative electrode and positive electrode are directly anchored on the copper foam via in-situ conversion reactions.

In an embodiment of the present invention, the rose-nanopetals are NiCuSe rose-petal structures.

In another embodiment of the present invention, the hybrid super-capacitor (HSC) cell has an operating potential window of 1.6 V.

In another embodiment of the present invention, the hybrid super-capacitor (HSC) cell has a specific energy of 87.6 Wh kg$^{-1}$ at a specific power of 914.3 W kg$^{-1}$.

In another embodiment of the present invention, the hybrid super-capacitor (HSC) cell has cycle lifetime with capacity retention of 91.3% over 10,000 cycles with 99% of columbic efficiency.

In another embodiment of the present invention, the hybrid super-capacitor (HSC) cell has an operating temperature range of –25 to 65° C.

In another embodiment of the present invention, the hybrid super-capacitor (HSC) cell has specific capacity of 534.2 mA h g$^{-1}$ for NiCuSe and 573.8 mA h g$^{-1}$ for FeSe at current density of 1 A g$^{-1}$, respectively.

In another embodiment of the present invention, the copper form is a 3D structure and is highly conductive.

In another embodiment of the present invention, size of the copper foam is 2*2 cm.

As another aspect of the present invention, a method of manufacturing a hybrid super-capacitor (HSC) cell is disclosed, the method comprising the steps of preparing a PVA-KOH gel electrolyte by mixing KOH and PVA powder; assembling solid-state NiCuSe//FeSe6 ASCs, by soaking a positive and a negative electrode in the gel electrolyte and then drying under vacuum; and sandwiching the positive and negative electrodes facing each other with a parafilm in between.

In an embodiment of the present invention, preparing the PVA-KOH gel electrolyte is done by mixing 2 M KOH and 2 gm of PVA powder in the 30 ml deionised water at 80° C. with continuous stirring.

In an embodiment of the present invention, the negative electrode is made up of FeSe nanoparticles, and the positive electrode is made up of rose-nanopetals.

In another embodiment of the present invention, the method comprising the steps of cleaning copper foam with deionized water, ethanol and acetone; oxidizing cleaned and dried copper foam in an etching solution containing mixture of NaOH and (NH4)2S2O8; allowing the oxidized copper foam to dry in a vacuum oven; preparing a growth solution and inserting the dried and oxidized copper foam; and conducting selenization of Ni(OH)2@Cu(OH)2 nanowires.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1A:
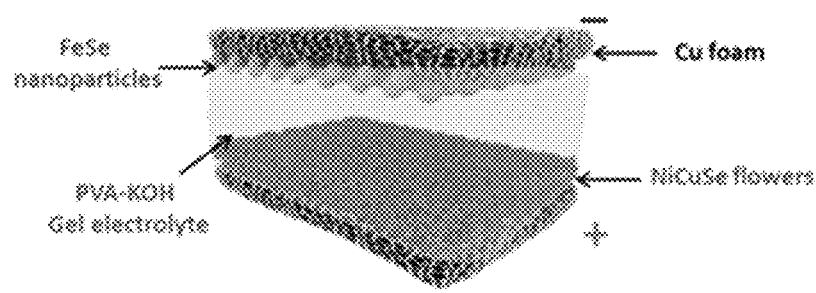
FIG. 1A shows schematics of the assembled NiCuSe//FeSe HSCs device, in accordance with the present invention.

The aspects of a method and the systems for the synthesis of high-energy solid-state hybrid supercapacitor electrode material from transition metal selenide material, according to the present invention will be described in conjunction with FIGS. 1A-10. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Transition metal selenide (TMS) have enthused a snowballing research and industrial attention due to their exclusive conductivity and redox activity features than their parent metal oxides, holding them as a great candidate for the emerging electrochemical devices. Therefore, the aspect of the present invention is to provide a method and the systems for the synthesis of high-energy solid-state hybrid supercapacitor electrode material from transition metal selenide material. Specifically, a versatile in-situ approach to design the nanostructured TMS materials for the high-energy solid-state HSCs. To solve the problems faced by traditionally implemented methods, the present invention provides a simple scaleup, solvothermal procedure to persistently synthesize NiSe@Cu2Se (denoted as NiCuSe) rose-petal structures and FeSe nanoparticles as battery-type electrodes for HSCs.

The present disclosure relates to a method of fabricating an HSC cell with the rose-nanopetals like NiSe@Cu2Se (NiCuSe) cathode and FeSe nanoparticles anode. Initially, the rose-nanopetals like NiSe@Cu2Se (NiCuSe) positive electrode and FeSe nanoparticles negative electrode are directly anchored on 3D highly conducting Cu foam via purposefully in-situ conversion reactions. Utilizing the complementary potential windows of the NiCuSe and FeSe in aqueous electrolytes associated with the excellent electrical conductivity and redox activity, the present method and system results in the superior electrochemical features for the half as well as full supercapacitor cell. The fabricated HSC cell was found to exhibit excellent performance features such as: (a) Large operating potential window of 1.6 V. (b) High specific energy of 87.6 Wh kg$^{-1}$ at a specific power of 914.3 W kg$^{-1}$. (c) excellent cycle lifetime with capacity retention of 91.3% over 10,000 cycles with 99% of columbic efficiency. The results obtained explicitly reveal the capability of prepared materials to operate as favorable battery-type electrodes for high energy HSCs cell. The innovative insights and electrode design for high conductivity holds great pledge in inspiring material synthesis strategies for upcoming energy storage systems. Several advantages include a stable operating voltage window, fast-charging, high energy/power density, high charge capacity, excellent cycling stability, large operating temperature range of −25 to 65° C. HSC produced can be used for different applications such as solar energy storage, portable electronics, hybrid electric vehicles, automobiles, transportation, high-voltage circuits, medical devices, etc.

Hybrid supercapacitors (HSCs) are expected to be the next generation electrochemical energy storage systems due to their unique characteristics including the high safety, low cost, and excellent electrochemical features. Though, the real-life applications of the SCs are limited owing to their lower energy density value resulted from the traditional surface capacitive charge storage mechanism which restricts the charge transfer process on or near surface. The transition metal selenides (TMSs) are emerging class of typical TMDs and potential candidates for SCs owing to their lower band gap, excellent electric conductivity and superior electrochemical performance. The present invention uses both the highly conductive metal selenides as positive and negative electrodes for HSCs device to provide high energy density. The fundamentals of the formation procedure of rose-petals like structures of the unique NiCuSe is discussed below. The inherent electrochemical charge storage performance of NiCuSe and FeSe electrodes in KOH electrolyte allows for systematic electrochemical measurements. The obtained HSCs device presented a high specific energy density of 87.6 Wh kg$^{-1}$ at a specific power of 914.3 W kg$^{-1}$ and longterm cycle life with 91.3% of retention after 10,000 continuous cycles. The rose-petal structure of NiCuSe$^{-6}$ electrode consists of numerous nanopetals which offers plenty of electrochemically active surface places and superhighways for the electron carriage, thereby increasing the charge conduction and energy storage capabilities. Changing the oxygen substituent with selenium reduce the electronic states and band gap of NiCuSe$^{-6}$ electrode, and therefore improving the conductivity and corresponding energy storage performance. The admirable electrochemical implementation of FeSe electrode could be ascribed to its nanoparticles composed architecture, which provide high electroactive area, well exposed electrochemically active sites and fast charge transferal kinetics.

Figure 1B:
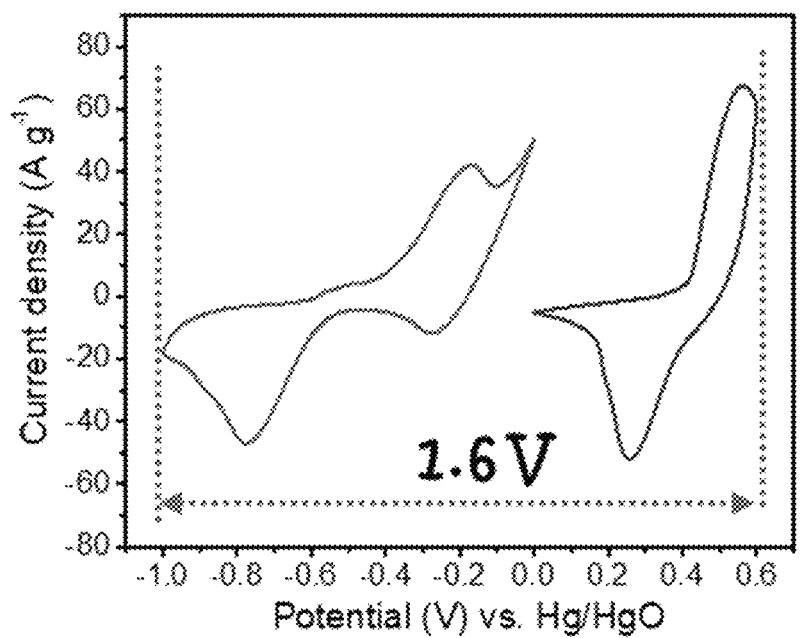
FIG. 1B shows the CV profiles of the NiCuSe and FeSe electrode at 40 mV/s scan rate in three-electrode configuration.

Specifically, selenium belongs to the same group as oxygen (O) and sulfur (S) in a periodic table and shows excellent metal like and inherent electric properties than those of S with higher electric conductivity Se (Se, 1×10$^{-3}$ S m$^{-1}$) than S (S, 5×10$^{-28}$ S m$^{-1}$). The self-assembled and binder-free growth of NiCuSe–6 rose-petal structures on CF substrate solves the problem associated with the dead volume and conductivity of the electrode. Therefore, the present invention offers a feasible route to develop high energy battery-type electrodes for upcoming hybrid energy storage systems. According to another aspect of the present invention, solid-state HSCs was constructed employing the NiCuSe$^{-6}$ as a battery-type positive electrode beside with FeSe as a battery-type negative electrode material and PVA/KOH as gel electrolyte. The schematic illustration of the assembled NiCuSe//FeSe HSCs device are displayed in FIG. 1A. For each type of SCs device, to achieve best electrochemical performance, the positive and negative electrodes must follow the mass balancing equation q+=q−. The optimal mass proportion of the positive electrode to the negative electrode was fixed to the 1:3.4 based on the comparative CV profiles of both the electrodes in three electrode system recorded at 40 mV s$^{-1}$ scan rate in their respective potential windows as shown in FIG. 1B. From the three-electrode measurements, it could be estimated that the prepared HSCs device validate the stable working voltage window of the 1.6 V.

Figure 1C:
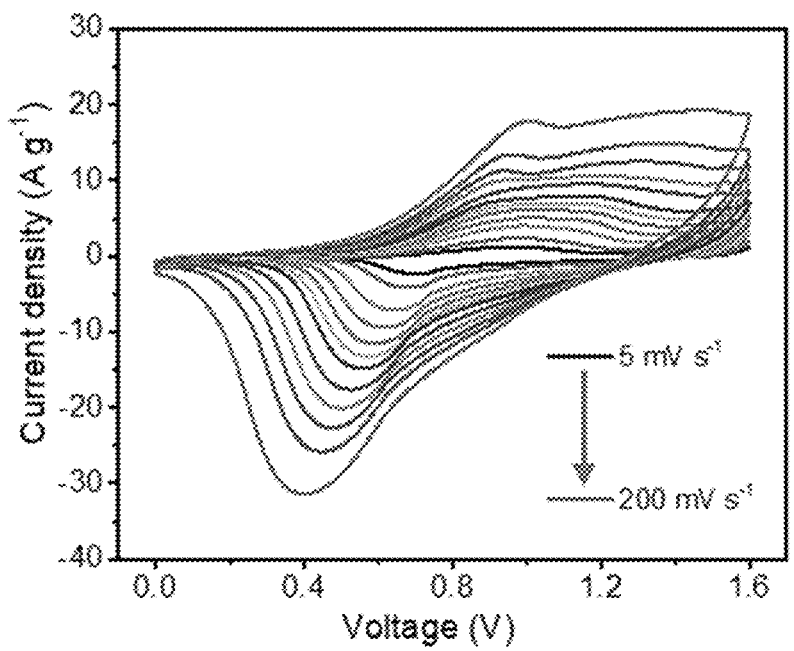
FIG. 1C shows the CV profiles for the NiCuSe//FeSe HSCs device recorded at various scan rates extending from 5 to 200 mV s$^{-1}$.
Figure 1D:
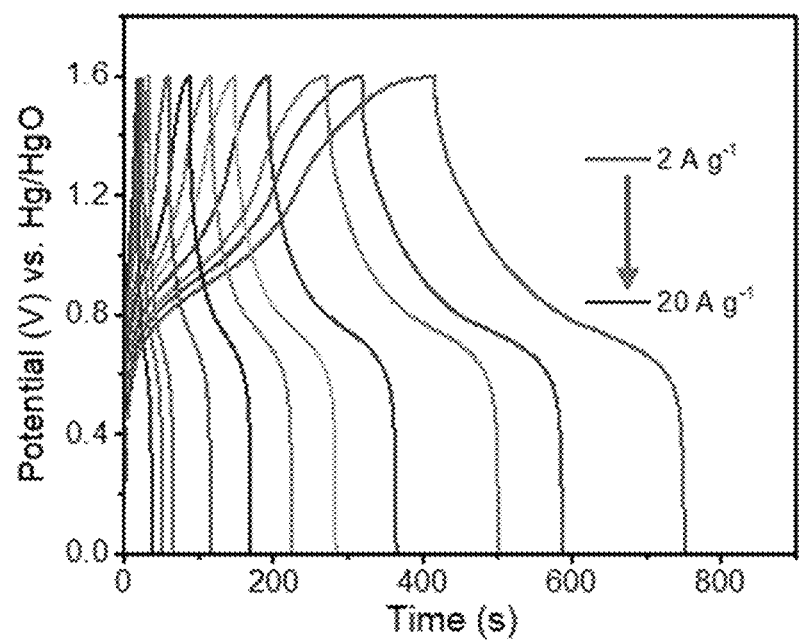
FIG. 1D shows GCD profiles for the NiCuSe//FeSe HSCs device at different scan rate and current densities, respectively.
Figure 1E:
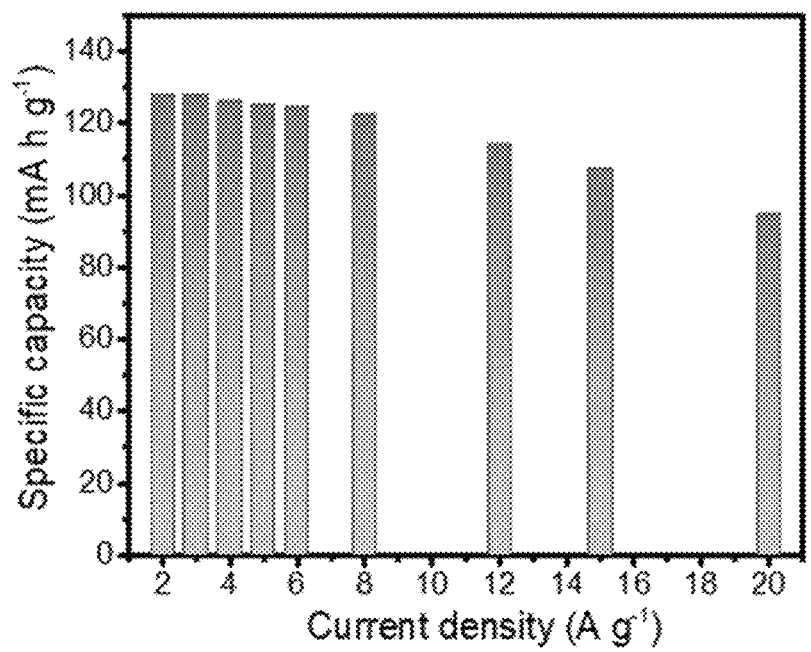
FIG. 1E shows the specific capacity at different current densities.
Figure 1F:
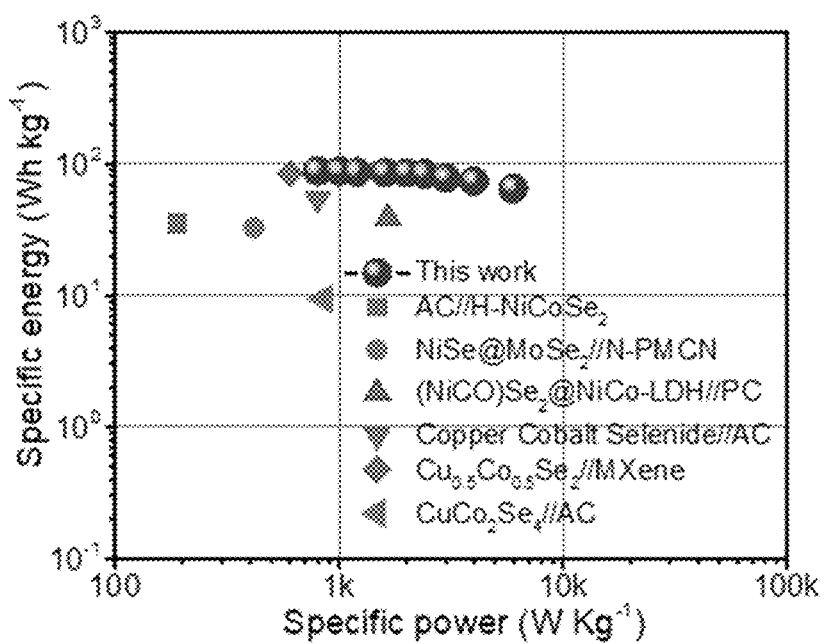
FIG. 1F shows Ragone plot for the NiCuSe//FeSe HSCs device.

In order to evaluate the rate capability of prepared NiCuSe//FeSe HSCs device, CV and GCD tests were conducted in the voltage range of 0 to 1.6 V. FIG. 1C represents the CV profiles recorded at various scan rates extending from 5 to 200 mV s$^{-1}$. The CV profiles at all the scan rates exhibit couple of two wide redox peaks along both the cathodic and anodic regions (FIG. 2C), signaling the superb battery type characteristics of the device. As clearly observed from the figure, even at high scan rate of 200 mV s$^{-1}$ outline of CV profile maintain well devoid of any deviation to the CV profile recorded at lower scan rate, indicating the remarkable reversibility and good compatibility of active electrodes with the electrolyte. CGD profiles for the HSC device in the voltage range of 0 to 1.6 V are presented in FIG. 1D. The GCD profiles show good symmetry at different current densities, revealing the high Coulombic efficiency and reversibility. Notably, the plateaus voltage profiles are typical features of battery-type characteristic which analogous to the CV results indicating faradic charge storage characteristic of NiCuSe//FeSe HSCs device. The specific capacity is calculated for the HSC device, presented in FIG. 1E. The NiCuSe//FeSe HSCs cell exhibits the highest specific capacity of 127.7 mA h g$^{-1}$ at 2 A g$^{-1}$ and further it is maintained to the 94.4 at 20 A g$^{-1}$ with rate performance of 73.9%. The specific power and energy for the HSCs device were computed from the capacitance of the device. FIG. 1F illustrates the Ragone plot showing the specific energy and specific power of the NiCuSe//FeSe HSCs device. The NiCuSe//FeSe HSCs device provide the highest specific energy of 87.6 Wh kg$^{-1}$ at specific power of 914.3 W kg$^{-1}$. Further still at high specific power of 6857 W kg$^{-1}$ the HSCs device held specific energy of 64.8 Wh kg$^{-1}$, implying that the prepared device delivers both high energy as well as high power. These achieved values for the present HSCs device are much higher than those of the HSCs devices reported earlier such as, AC//H—NiCoSe2 (35 Wh kg$^{-1}$ at 188 W kg$^{-1}$), NiSe@MoSe2//nitrogen-doped pomelo mesocarps-based carbon nanosheet (N-PMCN) (32.6 Wh kg$^{-1}$ at 415 W kg$^{-1}$), (NiCo)Se2/NiCoLDH//porous carbon (PC) (39 Wh kg$^{-1}$ at 1650 W kg$^{-1}$), copper-cobalt selenide//AC (53.86 Wh kg$^{-1}$ at 800 W kg$^{-1}$), Cu0.5Co0.5Se2//MXene (84.17 Wh kg$^{-1}$ at 604 W kg$^{-1}$), CuCo2Se4//AC (9.45 Wh kg$^{-1}$ at 850 W kg$^{-1}$).

Figure 1G:
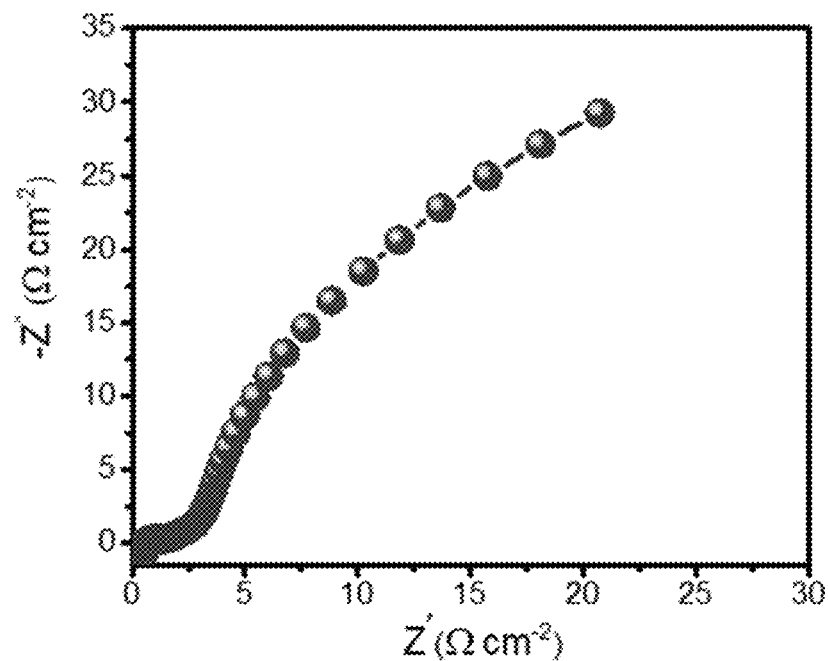
FIG. 1G shows Nyquist plot for the NiCuSe//FeSe HSCs device.
Figure 1H:
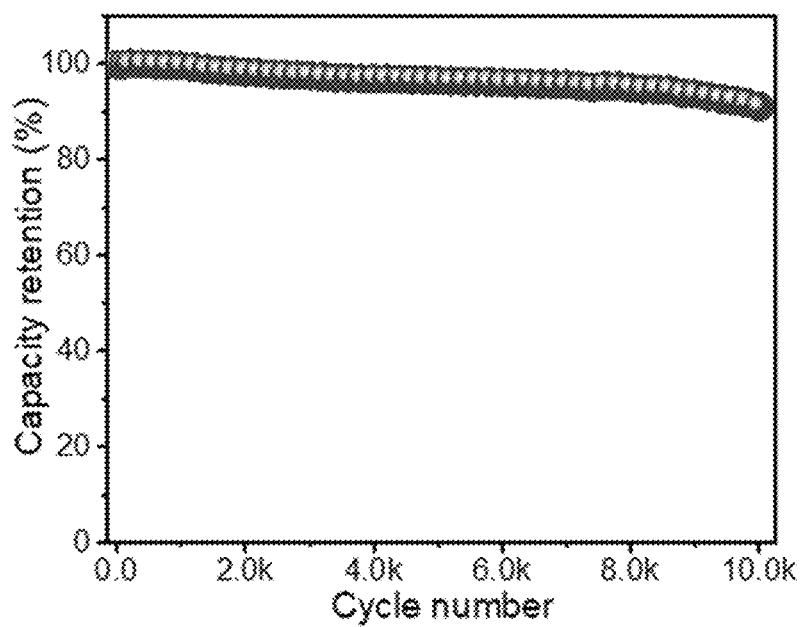
FIG. 1H shows plot of capacitance retention over cycle number for NiCuSe//FeSe HSCs device.

The HSC of the present invention represents significant energy and power performance, confirming the superiority of battery-type cathode and anode electrodes by stiff interfaces. The EIS analysis for the HSCs device shows the Rs and Rct of 0.5 and 0.94Ω, respectively (FIG. 1G). The small resistance revealing the fast redox kinetics in the active materials and the electrolyte ions and good compatibility of active materials with PVA-KOH gel electrolyte. Moreover, the cyclic performance of present HSCs device was evaluated at 10 A g$^{-1}$ over 10,000 cycles. Notably, the HSCs device illustrates the outstanding cycle stability beside good capacity retention of 91.3% (FIG. 1H), which further reveals excellent reversibility of active electrodes.

In accordance with the present invention, considering the synthesis of NiCuSe rose-petal structures (positive electrode)—Cu foam (CF) purchased from the TOB China was used as a substrate for the active growth materials. At first, the 2*2 cm CF was well cleaned with the 3 M HCl, deionized water, ethanol and acetone sequentially through the ultrasonication each of 10 min and dried in the vacuum oven prior to further use. To prepare the Cu(OH)2 nanowires on CF, the cleaned CF was oxidized in the etching solution containing mixture of NaOH and (NH$_4$)$_2$S$_2$O$_8$ for 10 min. Subsequently, the samples were dried in vacuum oven overnight. Further the thin layer of Ni(OH)$_2$ nanosheet was grown over the Cu(OH)$_2$ nanowires via ampere metric technique. Typically, 0.05 M Ni(NO$_3$)$_2$.6H$_2$O was dissolved in 40 mL of deionized water and used as growth solution. The electrodeposition was performed in a three electrode set-up, where Cu(OH)$_2$ nanowires deposited CF was used as working electrode, platinum as a counter electrode and Hg/HgO as a reference electrode. The three-electrode assembly was inserted into the growth solution and a constant voltage of −1.0 vs. (Hg/HgO) was applied to the electrodes for 10 min. The NiCuSe rose-petal structures were prepared by the selenization of Ni(OH)$_2$@Cu(OH)$_2$ nanowires. In a typical synthesis, the Ni(OH)$_2$@Cu(OH)$_2$ nanowires on CF were immersed into the 20 mL solution containing 0.1 g NaBH4 and 0.1 g Se powder. 10 mL ethanol was added to the above solution while stirring. Later, the reaction solution was transferred to Teflon lined stainless-steel autoclave at placed 180° C. in oven for 6 h. To obtain the proper nanostructure electrode, the selenization was performed at various time (2, 4, 6 and 8 h). After the autoclave naturally cooled to room temperature the CF was removed and washed several times with deionized water and ethanol. Finally, the prepared sample was dried at 60° C. in the vacuum oven overnight, the loading for NiCuSe rose-like flowers on CF was determined to be ~2-3 mg cm$^{-2}$ using highly precision microbalance.

In accordance with the present invention, considering the synthesis of FeSe nanoparticles (negative electrode), ampere metric technique was used to grow iron hydroxide (Fe(OH) 2) nanosheet over the CF substrate. Initially, 0.05 M Fe(NO$_3$)$_2$.6H$_2$O was dissolved in 40 mL of deionized water and used as growth solution. The electrodeposition was performed in a three-electrode set-up, where CF was used as working electrode, platinum as a counter electrode and Hg/HgO as a reference electrode. The three-electrode assembly was inserted into the growth solution and a constant voltage of −1.0 vs. (Hg/HgO) was applied to the electrodes for 20 min. The obtained sample was rinsed and dried in vacuum oven overnight. Afterwards to prepare FeSe nanoparticles on CF, the CF with Fe(OH)$_2$ nanosheet was immersed into the selenization solution as mentioned in the above part. The selenization reaction solution was placed in a Teflon-lined stainless-steel autoclave at 180° C. for 6 h in an oven. After the autoclave naturally cooled to room temperature the CF was removed and washed several times with DI water and ethanol. Finally, the prepared sample was dried at 60° C. in the vacuum oven overnight, and loading for FeSe nanoparticles on CF substrate was determined to be ~5 mg cm$^{-2}$.

With reghards to the construction of solid-state NiCuSe//FeSe Hybrid Supercapacitor (HSCs) in accordance with the present invention, initially, the PVA-KOH gel electrolyte was prepared by mixing 2 M KOH and 2 gm of PVA powder in the 30 ml deionised water at 80° C. with continuous stirring. To assemble the solid-state NiCuSe//FeSe 6 ASCs, both the positive and negative electrodes were soaked in a gel electrolyte for 20 mins and then dried under vacuum for 6 h. subsequently, the electrodes were sandwiched facing each other and packed with the parafilm. The electrochemical factors for the prepared electrodes and ASCs were calculated using the formulas below.

$$\text{Specific capacitance (F/g)} = \frac{i \cdot \Delta t}{m \cdot \Delta v},$$

where, Δt is the potential window.

$$\text{Specific capacity (mA h/g)} = \frac{I \times \Delta t}{m \times 3.6}$$

$$\text{Specific energy (Wh/kg)} = \frac{C \cdot \Delta V^2}{2 \times 3600}$$

$$\text{Specific power (W/kg)} = \frac{3600 \times \text{specific energy}}{\Delta t}$$

$$\text{Coulombic efficiency (\%)} = \frac{\text{discharge time} \times 100}{\text{charge time}}$$

$$\text{Coulombic efficiency (\%)} = \frac{\text{discharge specific energy} \times 100}{\text{charge specific energy}}$$

Mass balancing for both the electrodes to assemble the $$ASCs: \frac{m_+}{m_-} = \frac{C_- V_-}{C_+ V_+}$$

where, m, C and V are the mass (g/cm$^2$), capacitance and the potential window for the positive and negative electrode.

The structure of the prepared samples were analysed by using the X-ray diffraction (XRD) analysis (Bruker D8 ADVANCE). The oxidation states of the elements in the prepared materials were investigated by X-ray photoelectron spectrometry (XPS, Thermo Fisher Scientific, K-Alpha, USA) with non-monochromatic Al K-α radiation (1486.6 eV). The surface morphology was analyzed by with field emission scanning electron microscopy (FESEM, Thermo-scientific Apreo C) and high-resolution transmission electron microscopy (FETEM, JEM-2100F, JEOL, Japan). The elemental compositions were analysed by energy-dispersive X-ray spectroscopy. Initially the three-electrode measurements were performed in the 2 M KOH electrolyte. The prepared materials were used as working electrodes, Hg/HgO was used as a reference electrode and platinum plate was used as a counter electrode. The cyclic voltammetry (CV), galvanostatic chargedischarge (GCD), electrochemical impedance spectroscopy (EIS) and stability tests were carried out with the CH instrument.

Figure 2A:
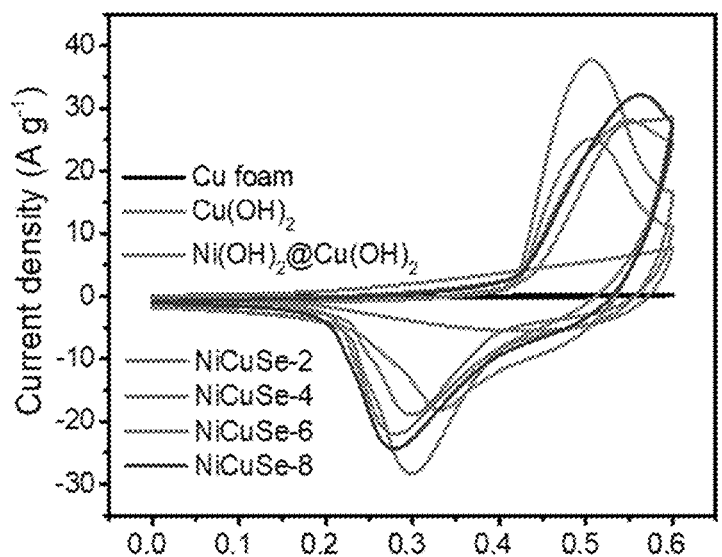
FIGS. 2A and 2B show CV and GCD profiles for Cu foam, Cu(OH)2, Ni(OH)2@Cu(OH)2 and all NiCuSe electrodes at constant scan rate and current density.

To verify the influence of selenization on the electrochemical performance of as-prepared electrodes, comparative electrochemical performance study was evaluated in a standard three electrode set-up utilizing 2M KOH electrolyte. FIG. 2A illustrates the cyclic voltammetry profiles of bare Cu foam, $Cu(OH)_2$, $Ni(OH)_2@Cu(OH)_2$, NiCuSe-2, $NiCuSe^{-4}$, $NiCuSe^{-6}$ and $NiCuSe^{-8}$ electrodes obtained at 40 mV s$^{-1}$ scan rate over the potential range of 0 to 0.6 V (vs. Hg/HgO). The pristine Cu foam substrate reveals much smaller CV profile area than those of other integrated electrodes, suggesting the negligible charge storage by the substrate. The $Cu(OH)_2$ electrode reveals pseudocapacitive behavior without redox peaks whereas, the couple of strong redox peaks are evidently seen in the $Ni(OH)_2@Cu(OH)_2$, $NiCuSe^{-2}$, $NiCuSe^{-4}$, $NiCuSe^{-6}$ and $NiCuSe^{-8}$ electrodes, analogues to the reversible faradaic reactions between Cu1+/Cu2+, Ni2+/Ni3+ and OH ions. The redox peaks in CV voltammogram represents the battery-type faradaic features of NiCuSe samples, specifies that the specific capacity is the result of faradic processes. The possible redox conversion of Ni2+/Ni3+ and Cu1+/Cu2+ are expressed through the following reactions:

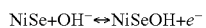

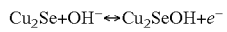

Figure 2B:
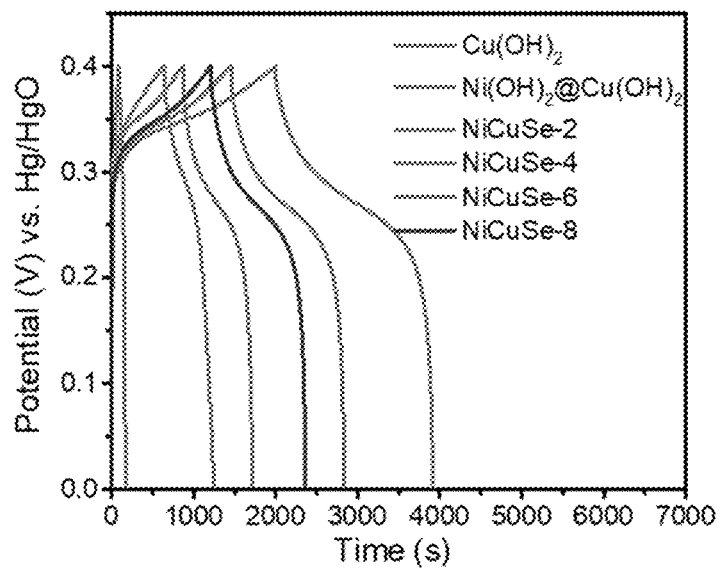
Figure 2C:
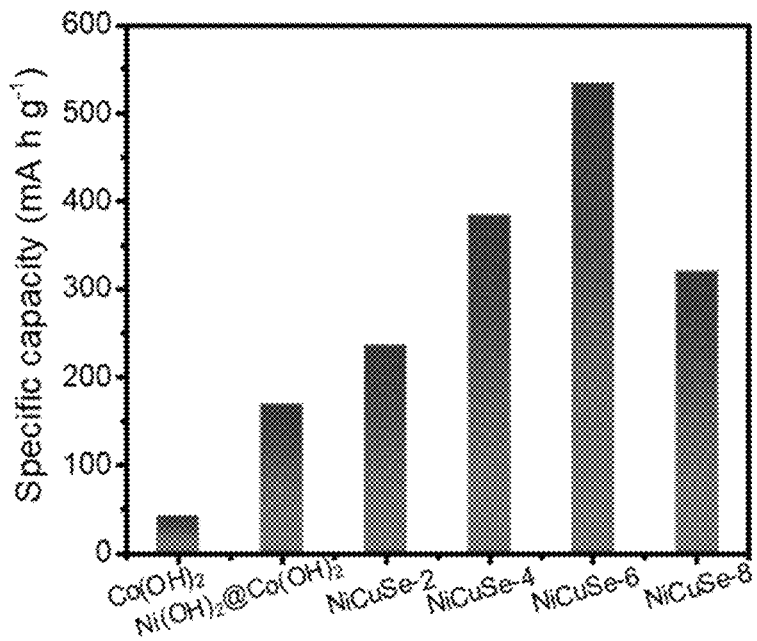
FIG. 2C shows plot of the specific capacity of different electrodes at current density of 1 Ag$^{-1}$.

As clearly seen from the figures, NiCuSe-6 electrode exhibited much higher current density and larger integral CV profile area compared to other electrodes, suggesting the faster faradic processes and higher energy storage capability of the electrode. The enhanced electrochemical activity of the selenide electrodes can be ascribed to the enhanced electrochemical activity that results from the introduction of selenium into the material which enhances the electric conductivity. The galvanostatic charge discharge (GCD) profiles of $Cu(OH)_2$, $Ni(OH)_2@Cu(OH)_2$, NiCuSe-2, NiCuSe-4, NiCuSe-6 and NiCuSe-8 electrodes were measured in 0-0.5 V (vs. Hg/HgO) at a constant current density of 1 A g$^{-1}$. As seen in FIG. 2B, the discharging time of $NiCuSe^{-6}$ electrode is longer among all, implying the higher energy storage, reliable with the CV analysis. The plateau in the GCD profiles indicates the dominance of charge storage by faradic processes. The specific capacity at 1 A g$^{-1}$, for the of $Cu(OH)_2$, $Ni(OH)_2@Cu(OH)_2$, NiCuSe-2, NiCuSe-4, NiCuSe-6 and NiCuSe-8 electrodes reach 43.3, 169.4, 235.5, 383.0, 534.2 and 320.3 mA h g$^{-1}$, respectively. Notably, the $NiCuSe^{-6}$ electrode represents much higher specific capacity compared to other selenide materials prepared at different times (details shown in FIG. 2C), which further evidence the optimized rose-petal structure morphology is advantageous for the progress of SCs activity. The electrochemical impedance spectroscopy (EIS) was executed to further know the reason behind the enhanced electrochemical performance of $NiCuSe^{-6}$ electrode and redox kinetics.

Figure 2D:
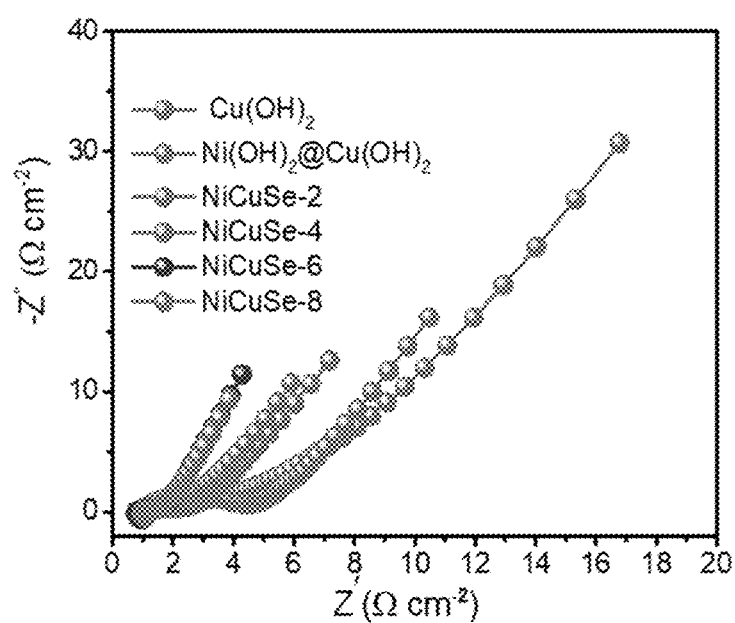
FIG. 2D shows Nyquist plot for Cu(OH)2, Ni(OH) 2@Cu(OH) 2 and all NiCuSe electrodes at same frequency range and applied voltage.

The Nyquist plots for $Cu(OH)_2$, $Ni(OH)_2@Cu(OH)_2$, $NiCuSe_{-2}$, $NiCuSe_{-4}$, $NiCuSe_{-6}$ and $NiCuSe_{-8}$ electrodes at voltage of 5 mV are shown in FIG. 2D. The intersect point of Nyquist plot to the x-axis at higher frequency side corresponds to the equivalent series resistance (Rs), that is the summation of ionic resistance of electrolyte, intrinsic resistance of the active material and current collector and the last contact resistance of electrolyte/electrode interface. The diameter of semicircle in the Nyquist plot corresponds to the charge-transfer resistance (Rct), while the linear line at lower frequency region corresponds to the Warburg resistance (Zw), associated to the ion diffusion/transfer in electrolyte. The Rs values of $Cu(OH)_2$, $Ni(OH)_2@Cu(OH)_2$, NiCuSe-2, NiCuSe-4, NiCuSe-6 and NiCuSe-8 electrodes are 1.01, 0.95, 1.08, 0.94, 0.88 and 1.05Ω, respectively. The obtained Rct are 1.72, 3.49, 1.28, 0.83, 0.49 and 0.54Ω, respectively, for $Cu(OH)_2$, $Ni(OH)_2@Cu(OH)_2$, NiCuSe-2, NiCuSe-4, NiCuSe-6 and NiCuSe-8 electrodes. These outcomes indicate that both Rs as well as Rct are significantly decreased after the selenization, resulting in enhanced electric conductivity and charge transfer mobility within the electrode. The excellent electric conductivity of NiCuSe-6 electrode is attributed to the exclusive rose-petal structure and metal-like features of Se atom than those of 0. Thus, the comparative CV, GCD and EIS analysis verifies that the NiCuSe-6 rose-petal structure electrode possess excellent charge storage capacity with high specific capacity as well as electric conductivity arises from the unique flower structure composed of numerous nanopetals. In consideration with the excellent electrochemical performance, higher charge storage capacity and the excellent electric conductivity of the NiCuSe-6 rose-petal structures electrode was considered as the optimum electrode and further it is used for additional three-electrode measurements to evaluate its rate performance, charge storage contributions and cycling stability.

Figure 3A:
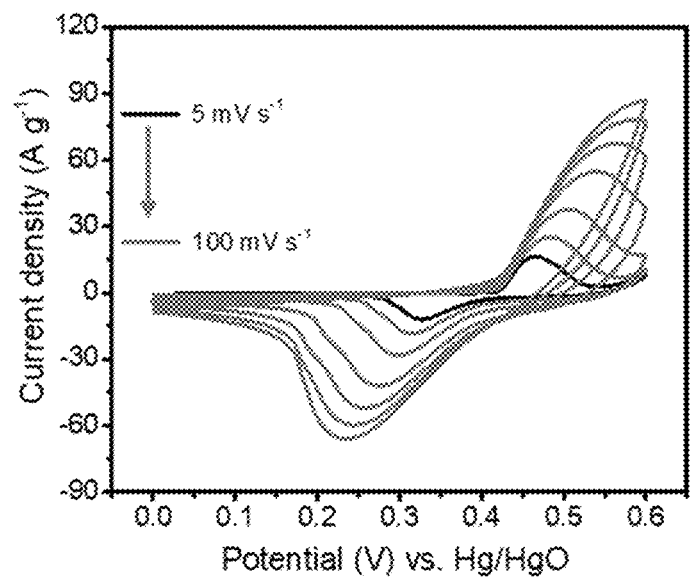
FIGS. 3A and 3B show CV profiles for NiCuSe-6 and FeSe electrodes respectively.
Figure 3B:
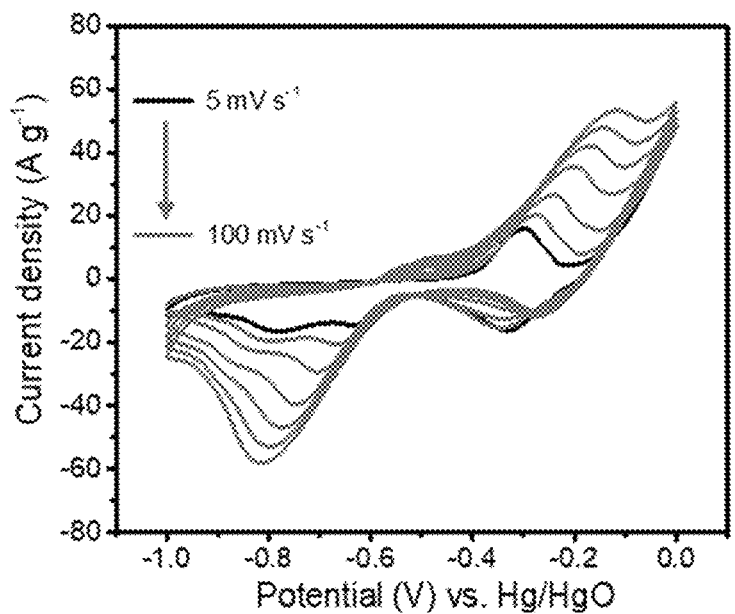
Figure 3C:
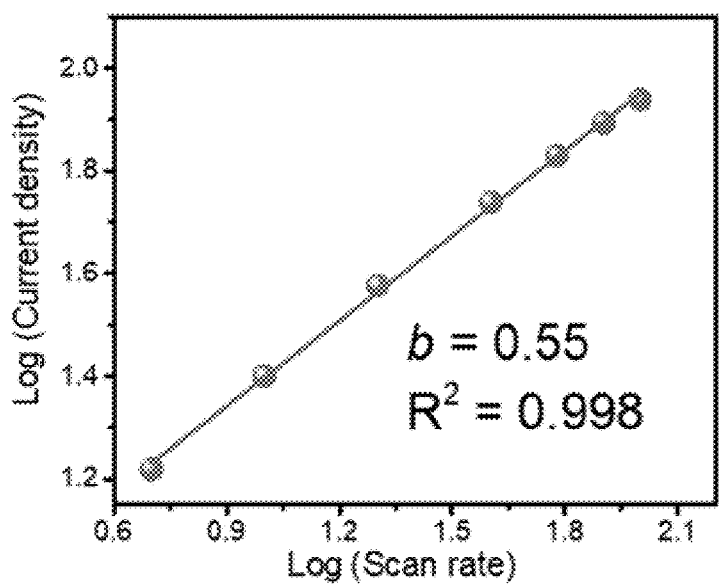
FIGS. 3C and 3D show the plot of log (current density) versus log (scan rate) of b-values for NiCuSe-6 and FeSe electrodes respectively.
Figure 3D:
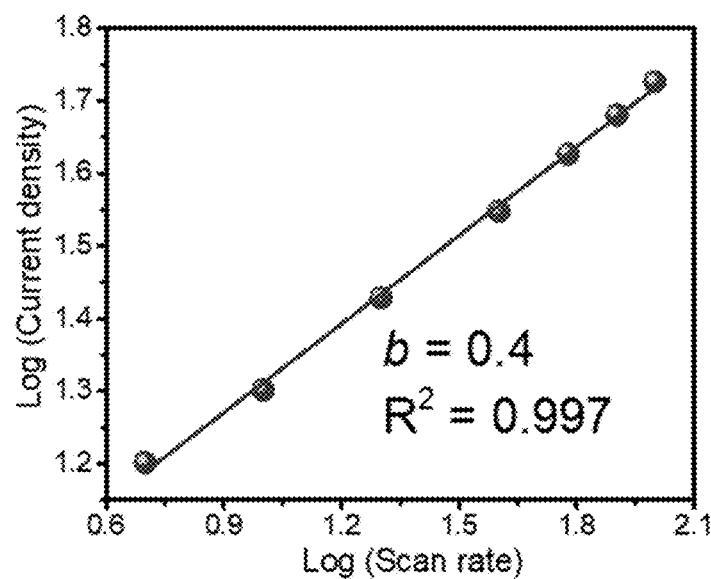
Figure 3E:
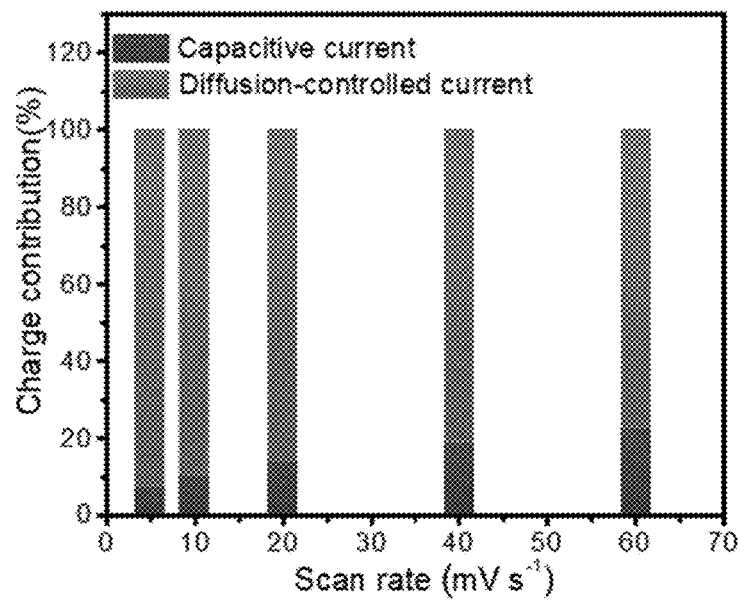
FIGS. 3E and 3F show charge storage contribution (capacitive and diffusion controlled current) to scan rates for NiCuSe-6 and FeSe electrodes respectively.
Figure 3F:
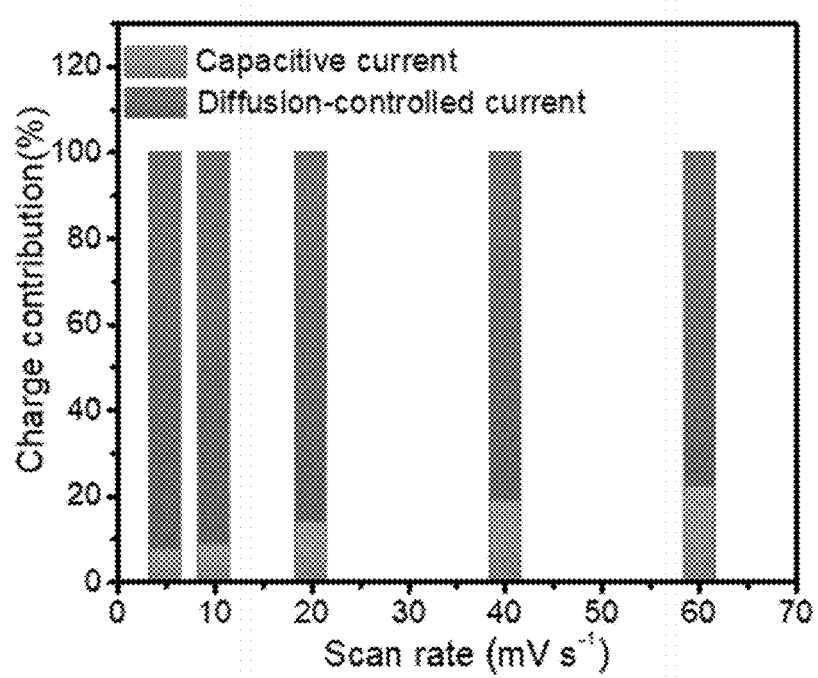
Figure 4A:
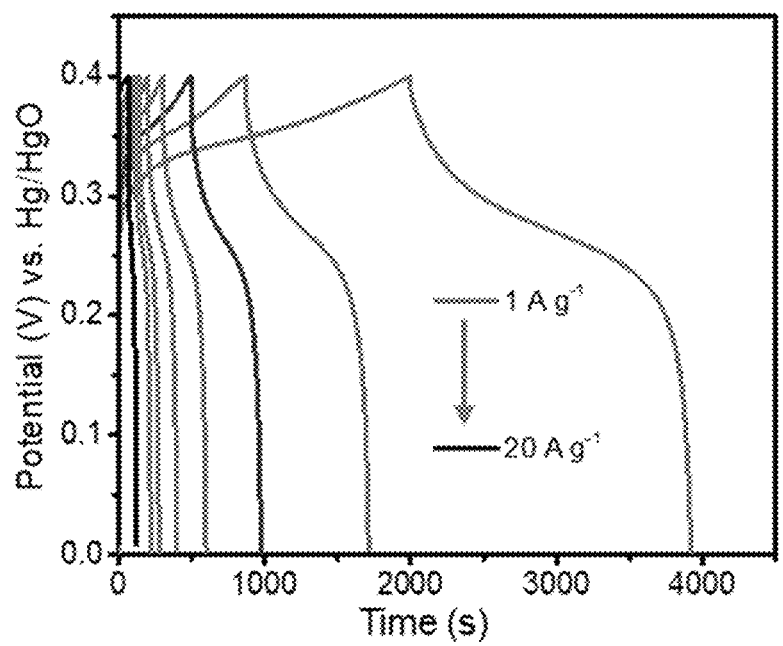
FIGS. 4A and 4B show GCD profiles for NiCuSe and FeSe electrodes respectively at different current densities.
Figure 4B:
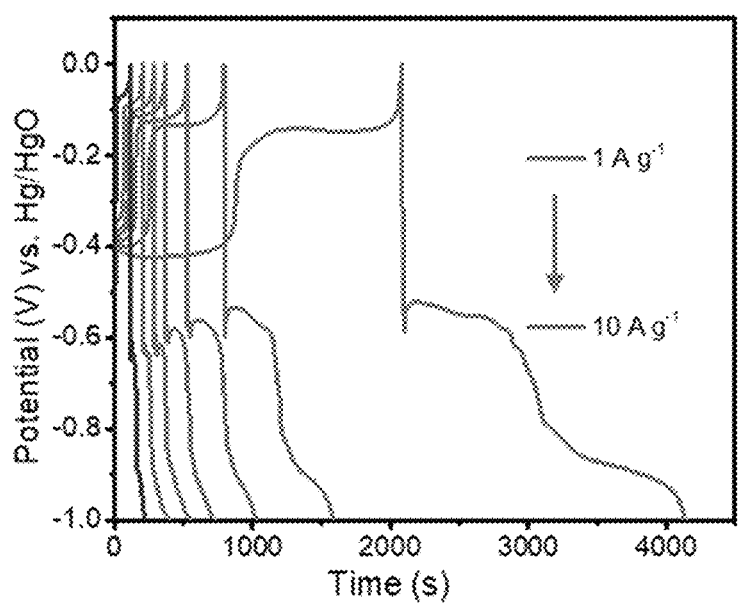
Figure 4C:
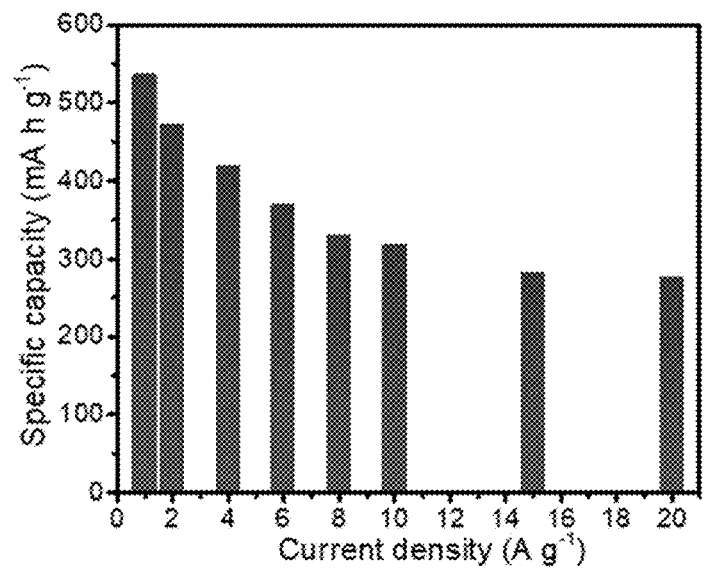
FIG. 4C shows plot of specific capacity against the current density for NiCuSe and FIG. 4D for FeSe electrodes.
Figure 4D:
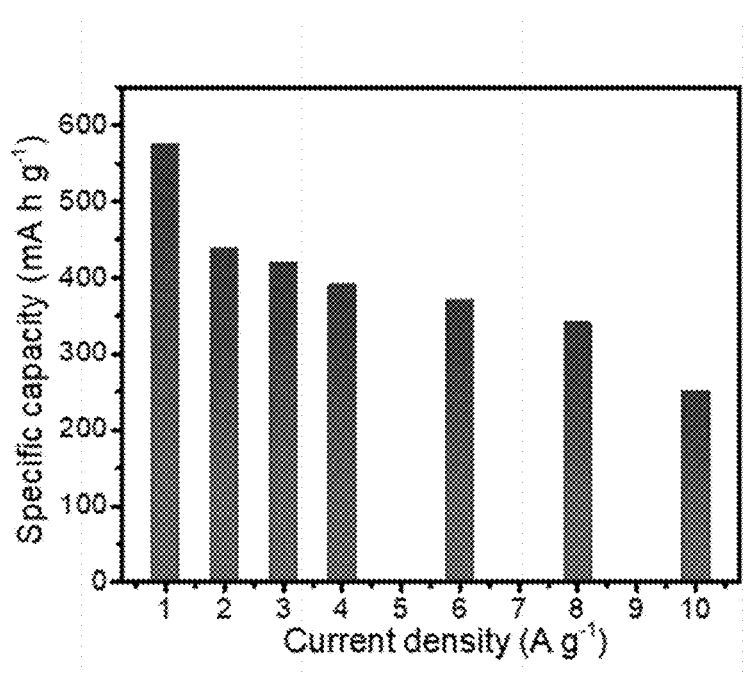
FIG. 4E shows plot of the Coulombic and energy efficiency for NiCuSe.
FIG. 4F for FeSe electrodes at different current densities.
Figure 4E:
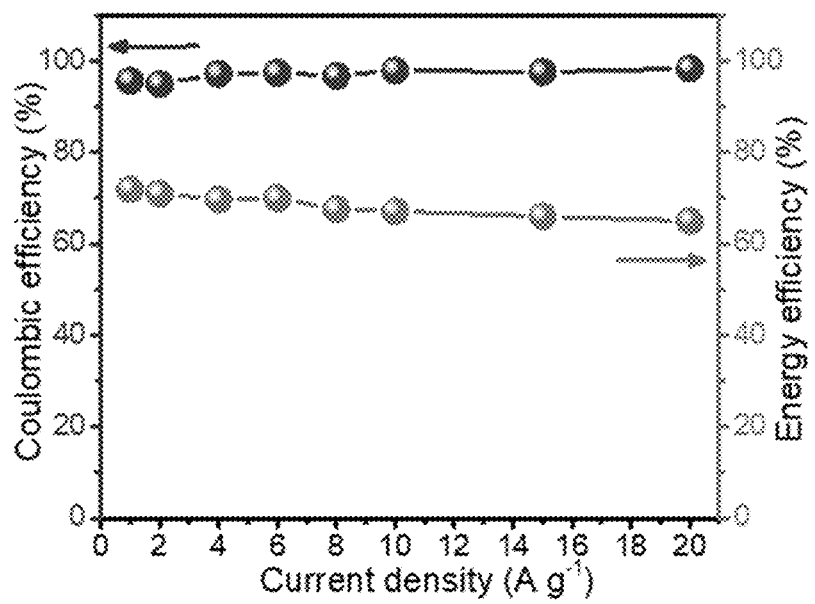

To illustrate the charge storage contribution of NiCuSe-6 and FeSe electrode, CV profiles were recorded with the increase in scan rates (5 to 100 mV s−1). FIG. 3A illustrates the CV profiles for NiCuSe-6 electrode within the potential 0 to 0.6 V (vs. Hg/HgO). The CV profiles recorded at all the scan rates reveal a couple of conspicuous cathodic and anodic peaks, which can be associate with the reversible faradic redox reactions of the active material. Notably, the current response increases with scan rate, suggesting the ideal faradic feature. The shift in potentials of cathodic and anodic peaks towards their higher potential side indicates the increased internal diffusion resistance of the faradic electrode with higher scan rates. The constantly expanded electrochemical activity of the NiCuSe-6 electrode can be attributed to the lower valence active ions Cu$^+$ and Ni$^{2+}$ within the sample and incorporation of highly conductive Se. The CV profiles for FeSe electrode at different scan rates (5 to 100 mV s−1) in −1.0 to 0 V (vs. Hg/HgO) potential range are shown in FIG. 3B. The CV profiles for FeSe electrode reveals battery-type characteristics with dominant redox peaks at all the scan rates and nearly symmetric current response, indicating excellent SCs performance with high-rate performance. Further to know the charge storing kinetics of the NiCuSe-6 and FeSe electrodes, power law I=axvb (here, a and b are the variables) was used to further understand the correlation amongst the peak current (I) and scan rate (v). The b-value is determined from the slop of the plot of log (current density) vs. log (scan rate). Theoretically, the b-value of 0.5 reveals the ideal diffusion-controlled phenomenon, whereas b-value of 1.0 suggests the surface-dominant capacitive phenomenon of the electrode. The linear fitting results for the NiCuSe–6 (FIG. 3C) and FeSe (FIG. 3D) electrodes indicate the b-value of 0.55 and 0.40, respectively, at the cathodic region which is close to the 0.5 rather than 1. Thus, indicates that the peak current contribution mainly originates from the diffusion-controlled processes of the NiCuSe–6 and FeSe electrodes during electrochemical process in electrolyte. As per previous studies, metal selenides are the narrow band gap materials compared to their oxides/hydroxide counterparts which give rise to higher electric conductivity and introduces additional surface sites for efficient charge storage. Moreover, the current contribution arises from the capacitive and diffusion-controlled processes at fixed potential can be separately quantized according to the equation:

$$i = k_1 v + k_2 v_{1/2}$$

where k1 and k2 be the factors for the capacitive and diffusion-controlled phenomenon. The charge storage roles of both diffusion-controlled and capacitive processes of NiCuSe–6 (FIG. 3E) and FeSe (FIG. 3F) electrodes were evaluated. The current contributions to the total charge are dominantly governed by the diffusion-controlled phenomenon owing to the rapid and reversible redox reactions. Further the capacitive charge storage to the overall charge increases with the scan rate. The proportion of nano-faradic capacity is 7.8 and 7.7% and at the 5 mV s−1 for NiCuSe–6 and FeSe electrodes, respectively, signifying the dominant diffusion-controlled feature of NiCuSe–6 electrode which is analogous to the reported battery-type electrode materials. FIG. 4A shows CGD profiles of NiCuSe–6 electrode obtained at various current densities. Each GCD profile indicate typical faradic features with well-specified potential plateau, which is different than linear profile of electric double-layer capacitor (AC and graphene) and pseudocapacitors ($MnO_2$, $RuO_2$, and $WO_3$). Also, the GCD profiles of NiCuSe–6 electrode are almost symmetric, suggesting the higher redox reversible performance. The GCD profiles of FeSe electrode at various current densities displayed in FIG. 4B revealing non-linear profiles with longer discharging times and are well analogous to the CV outcomes. As both the materials show battery type performance rather than the pseudocapacitive, the specific capacity is needed to calculate. The obtained specific capacity for the NiCuSe–6 electrode is presented in FIG. 4C. The specific capacity of NiCuSe–6 electrode reaches to 534.2 mA h g−1 at 1 A g−1. Further, at the high discharge current density of 20 A g−1, the NiCuSe–6 electrode preserved specific capacity of 281.7 mA h g−1, indicating 52.7% of rate performance. The specific capacity for FeSe electrode is shown in FIG. 4D. At the current density of 10 A g−1, the specific capacity of FeSe electrode is 573.8 mA h g−1, which maintained to 250 mA h g−1 as the current density reaches to 80 A g−.

Figure 4F:
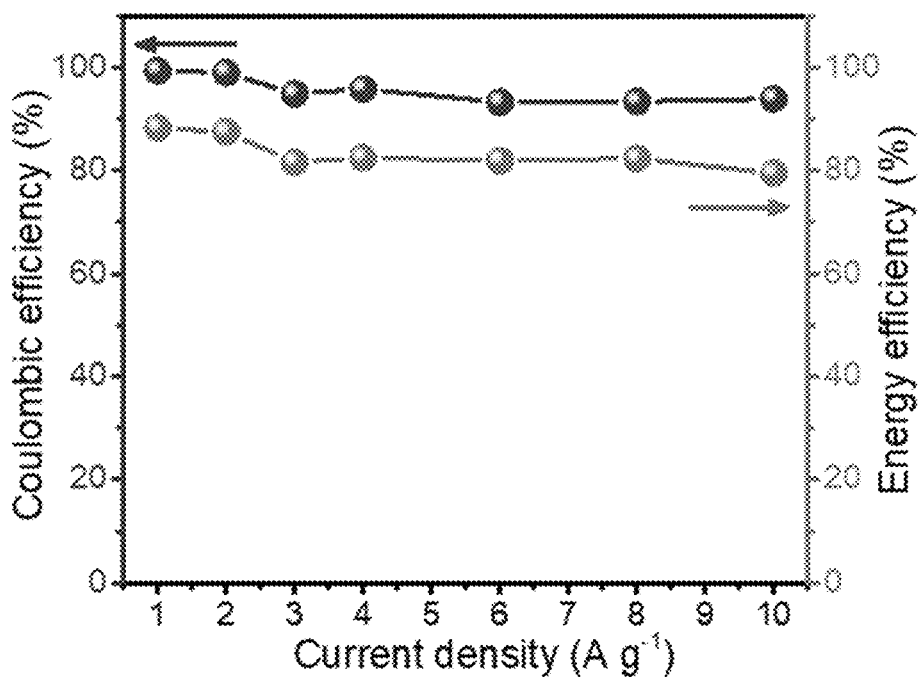
Figure 5A:
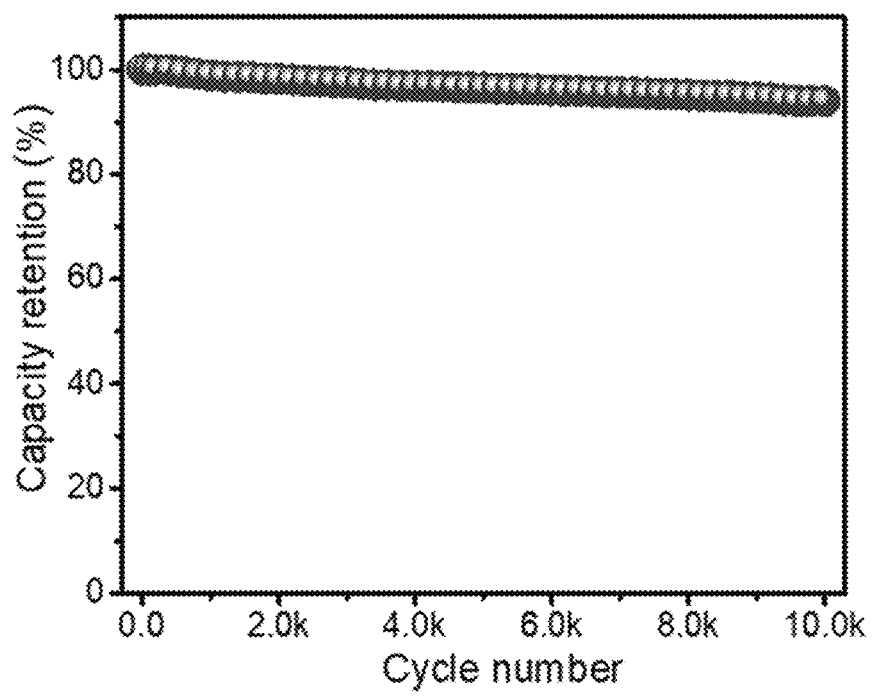
FIG. 5A shows plot of capacity retention versus cycle number for NiCuSe$^{-6}$.
Figure 5B:
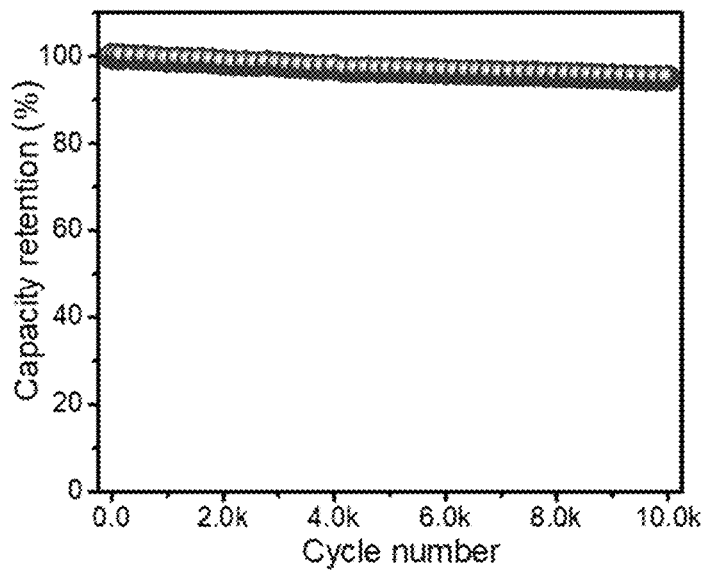
FIG. 5B for FeSe electrodes over 10,000 cycles.

The Coulombic and energy efficiency of NiCuSe–6 and FeSe electrodes are calculated. As clearly seen in the FIG. 4E, the NiCuSe–6 electrode demonstrates ~97% coulombic efficiency at all the current densities. The energy efficiency of NiCuSe–6 electrode varies in 67-71%, signifying the outstanding energy storing capability. The FeSe electrode illustrates coulombic efficiency of 95%, with energy efficiency varies between 80-88% at all the current densities (FIG. 4F). Moreover, the stability of active electrode materials is basic prerequisite of SCs for its workable application. Therefore, the cycling stability of NiCuSe–6 and FeSe electrodes was inspected at a constant current density for repetitive GCD cycles. According to FIGS. 5A-5B, remarkably, the NiCuSe–6 electrode demonstrates capacity retention of 93.6% whereas FeSe electrode maintained decent stability along with capacity retention of 95% over 10,000 cycles, respectively. The enhanced cycling stability demonstrates the pointedly positive influences offered by highly conductive selenium within the NiCuSe–6 rose-petal structures and FeSe nanoparticles. The excellent electrochemical performance of NiCuSe–6 rose-petal structures electrode in terms of specific capacity, rate capability, Coulombic efficiency and cycling stability ascribed to the following reasons—first, self-assembled and binder-free growth of NiCuSe–6 rose-petal structures on CF substrate stunned the problem associated with the dead volume and conductivity of the electrode. Secondly, the rose-petal structure of NiCuSe–6 electrode consists of numerous nanopetals which offers plenty of electrochemically active surface places and superhighways for the electron carriage, thereby increasing the charge conduction and energy storage capabilities. Lastly, changing the oxygen substituent with selenium reduce the electronic states and band gap of NiCuSe–6 electrode, improving the conductivity and corresponding energy storage performance Besides, the admirable electrochemical implementation of FeSe electrode could be ascribed to its nanoparticles composed architecture, which provide high electroactive area, well exposed electrochemically active sites and fast charge transferal kinetics.

Figure 10:
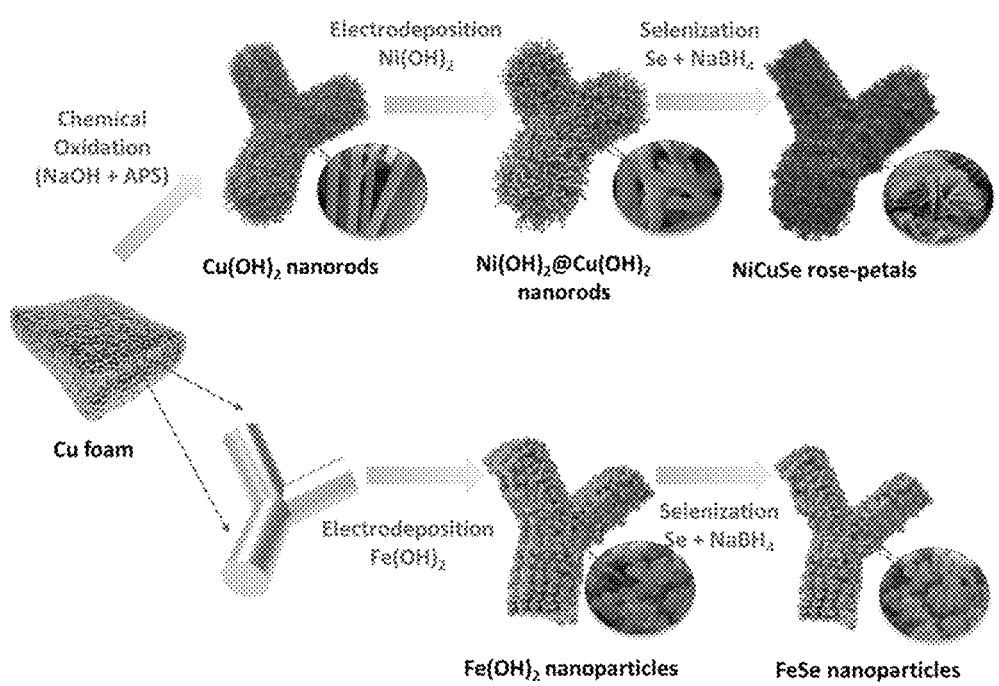
FIG. 10 shows schematic illustration for the synthesis procedure for NiCuSe rose-petal structures and FeSe nanoparticles.

The solvothermal synthesis procedure for the growth of NiCuSe structures on Cu Foam (CF) substrates are pictorially illustrated in FIG. 10. Initially, $Cu(OH)_2$ nanowires arrays were sprouted on CF substrate via the oxidative etching. The oxidative etching of the CF in alkaline solution develops $Cu(OH)_2$ nanowires with special connection with the CF substrate. Nevertheless, the low electric conductivity of $Cu(OH)_2$ nanowires limits the energy storage performance. Several approaches are recommended in former literature with the ribbon of Cu(OH)¬2 nanowires with another metal to improve the electrochemical performance. To improve the electrochemical features of Cu(OH)¬2 nanowires, Ni(OH)¬2 nanosheets are grown on the Cu(OH)¬2 through the simple electrodeposition technique. It is well known that the metal hydroxide-based electrode materials are not able to work for the long-term cycling due to the structural instability and low electrical conductivity. Therefore, further engineering is necessary to improve the resultant electrochemical features of the electrodes and SCs cells. To aim this, here in-situ selenization approach is utilized to boost the overall electrochemical features of the materials. With this the obtained Ni(OH)–2@Cu(OH)¬2 sample are converted into the metal selenides through the selenization process by hydrothermal route. In order to get the suitable NiCuSe nanostructure, selenization reaction was performed at different times. The samples obtained with 2, 4, 6 and 8 h selenization time are abbreviated as NiCuSe–2, NiCuSe–4, NiCuSe–6 and NiCuSe–8, respectively. Furthermore, to develop all TMS-based hybrid SCs, we prepared the $Fe(OH)_2$ on CF by electrodeposition method and later it was converted to FeSe by selenization reaction.

Figure 6A:
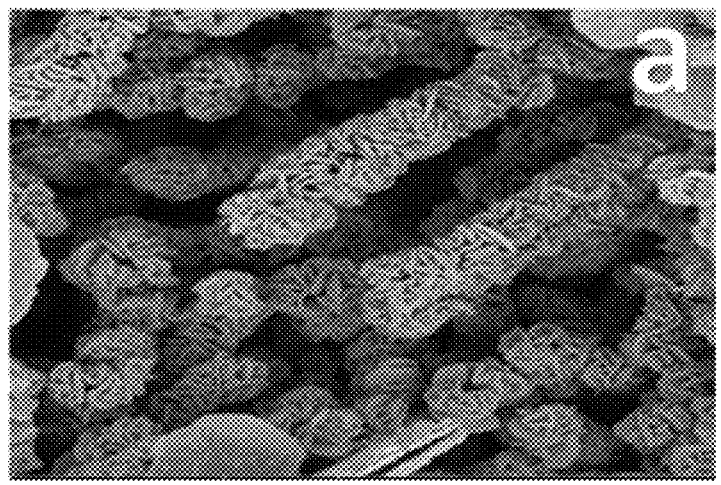
FIG. 6A shows SEM images for NiCuSe$^{-2}$, FIG. 6B for NiCuSe-4, FIG. 6C for NiCuSe$^{-6}$ and FIG. 6D for NiCuSe$^{-8}$ samples which indicates the typical SEM images of as prepared NiCuSe samples.
Figure 6B:
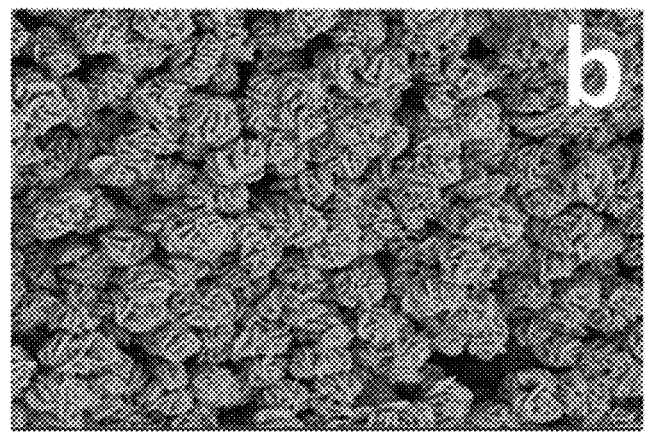
Figure 6C:
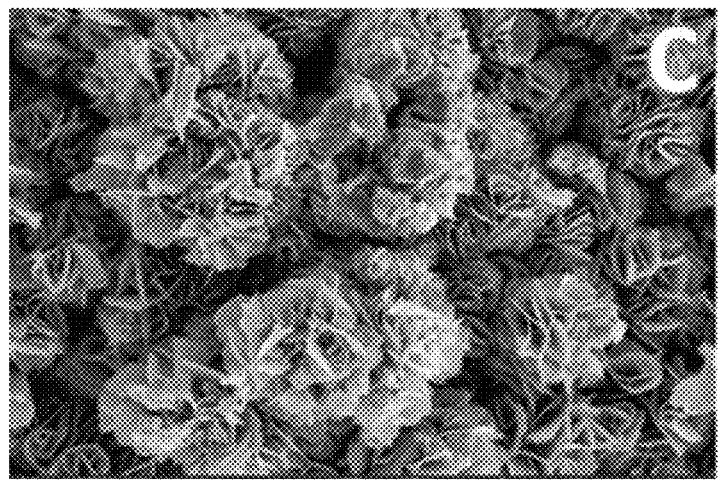
Figure 6D:
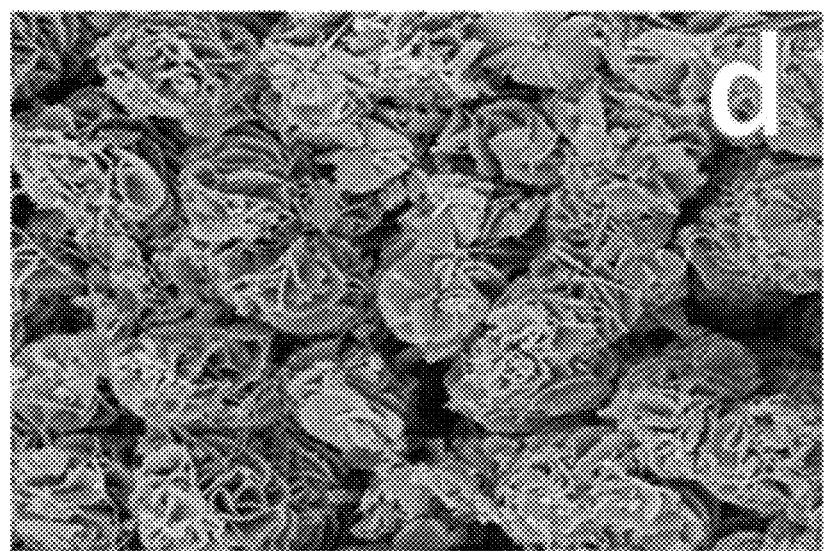

To achieve the specific morphology for the NiCuSe sample, time dependent selenization were performed. FIGS. 6A-6B indicates the typical SEM images of as-prepared NiCuSe samples. As seen from the figure, with the different selenization time period the nanostructure of $Ni(OH)_2$@Cu(OH)2 switched from the original rigid nanowires to the highly porous 3D hierarchical rose-petal like structures. In the early stages, thin layer of nanoflakes started to grow over the nanowire structure and overall nanowire is surrounded by the nanoflakes (FIGS. 6A and 6B). For the 6 h selenization 8 reaction, the nanowires completely transferred to rose-petals. (FIG. 6C). Further increasing the selenization time to 8 h ruin the rose-petal structure and the petals seen to be loosely bound to the entire structure (FIG. 6D). From the viewpoint of morphology of all the samples and its hierarchical architectures, it is observed that the architectures prepared with the 6 h selenization time can be judged as a best possible for more detailed assessment.

Figure 7A:
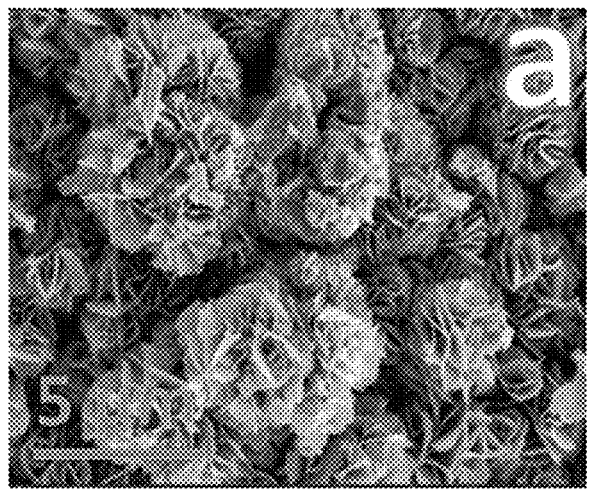
FIGS. 7A and 7B show SEM images for the NiCuSe$^{-6}$ sample at two different magnifications.
Figure 7B:
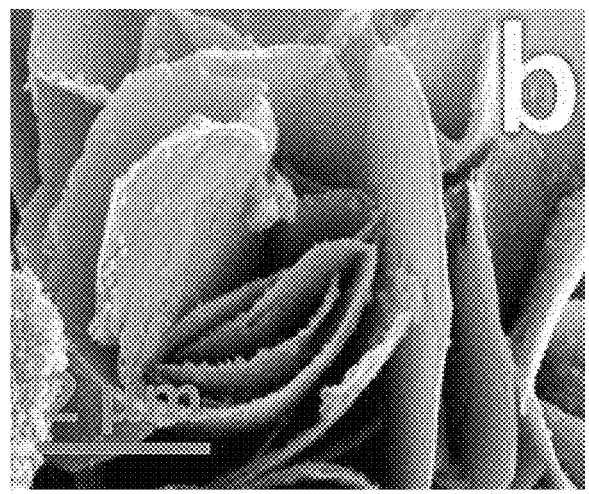
Figure 7C:
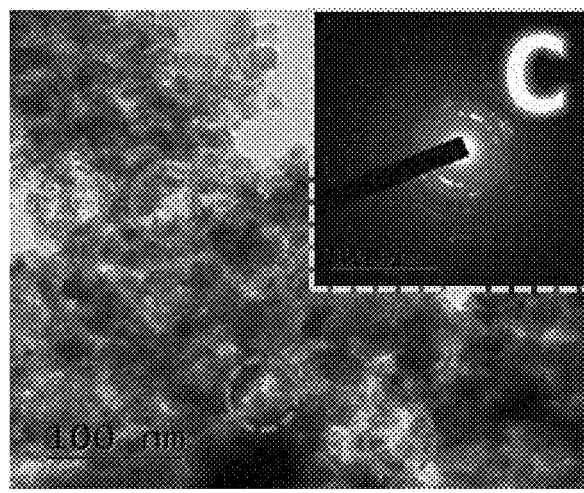
FIG. 7C shows TEM (Inset shows SAED pattern for the NiCuSe-6 sample) and FIG. 7D shows HRTEM images for the NiCuSe-6 sample.
Figure 7D:
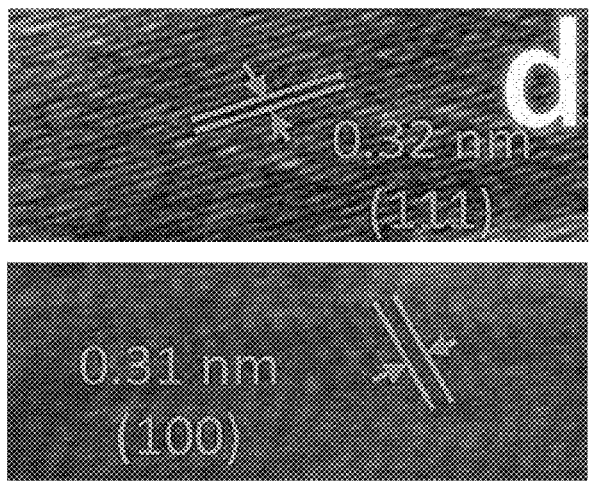
Figure 7E:
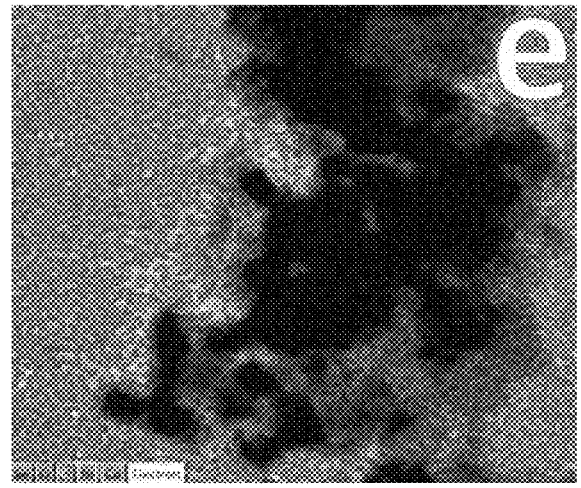
FIGS. 7E-7H shows EDS elemental mapping images for NiCuSe-6 sample.
Figure 7F:
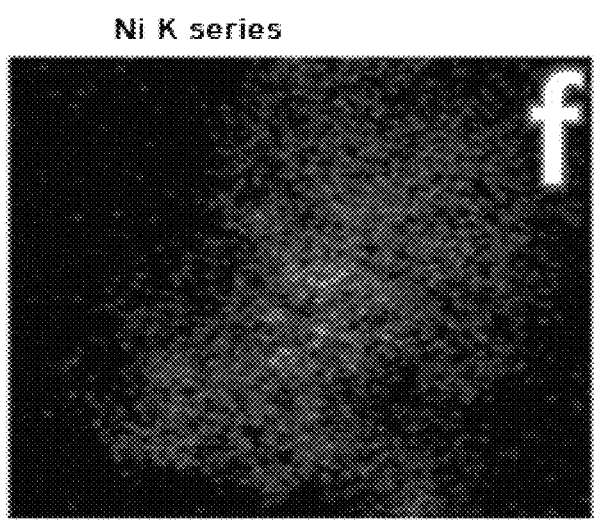
Figure 7G:
Figure 7H:

The low magnification SEM (FIG. 7A) image for the NiCuSe–6 samples visibly showing that the typical sample consists of plenty of rosepetals flowers with individual flower of ~5 μm diameter throughout the skeleton of CF substrate in each possible direction. The high magnification SEM (FIG. 7B) image showing that the number of nanoflakes-like petals stuck together to form a rose-petal structure over the CF. Notably, the rosepetal structure of NiCuSe–6 samples is very stable and show integral appearance. The nanopetals composed structure of NiCuSe–6 samples are extremely suitable for extreme energy storage devices owing to their awfully porous 3D architecture delivering number of surface-active sites throughout the redox process. Moreover, the nanopetals are not only competent to carry the produced electrons but also stimulate the dispersion kinetics by increasing electrode-electrolyte interaction region and consequently the electrochemical activity. Besides, substituting oxygen with selenium dramatically enhance the electric conductivity of electrodes assisting to boost the electrochemical behavior and subsequent energy density of the SCs cell. Additionally, switching the oxygen with selenium modulate the electronic states and band structures, resulting in the greater electric conductivity and energy storing performance Transmission electron microscopy (TEM) is further applied to review the detailed morphological features of the NiCuSe–6 sample. The TEM image presented in FIG. 7C, illustrates that the rose-petal like structure of NiCuSe–6 is formed by the numerous ultrathin nanopetals, after selenization. Besides, the presence of defects and dislocations are observed in the sample, shown by circles. Generally, number of defects originate in the conjointly attached nanopetals, which are normally assumed to the electroactive sites with good electrochemical activity. The selective area electron diffraction (SAED) (Inset of FIG. 7C) pattern for the NiCuSe–6 sample also indicates the crystalline nature, ties with the XRD results. The high-resolution TEM (HRTEM) image for the NiCuSe6 sample is displayed in FIG. 7D. The observed lattice spacings of 0.32 and 0.31 nm are indexing the (111) and (100) plane of cubic Cu2Se phase and hexagonal NiSe phase, respectively, which further confirm the formation of Cu2Se, and NiSe in the NiCuSe–6 sample. Additionally, the STEM-EDS mapping images (FIGS. 7E-H) of NiCuSe–6 sample clearly reveals the uniform distribution of Ni, Cu and Se elements throughout the sample. Generally, carbonaceous materials are widely explored as anodes for the construction of HSCs devices. Nevertheless, the fabricated device might not provide an elevated energy density because of the low capacitance and poor energy storage capability of carbon-based materials.

Figure 7I:
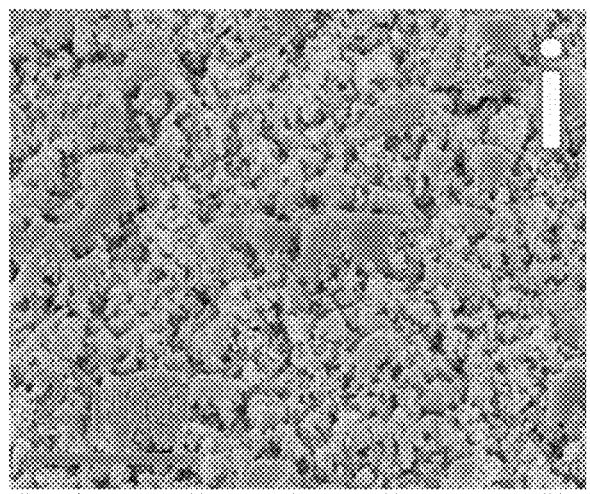
FIGS. 7I and 7J shows SEM images for the FeSe sample at two different magnifications.
Figure 7J:
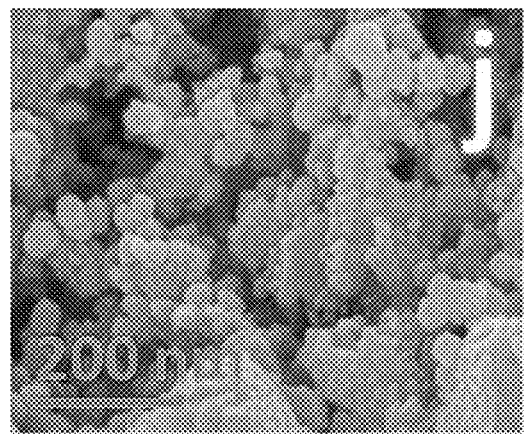
Figure 7K:
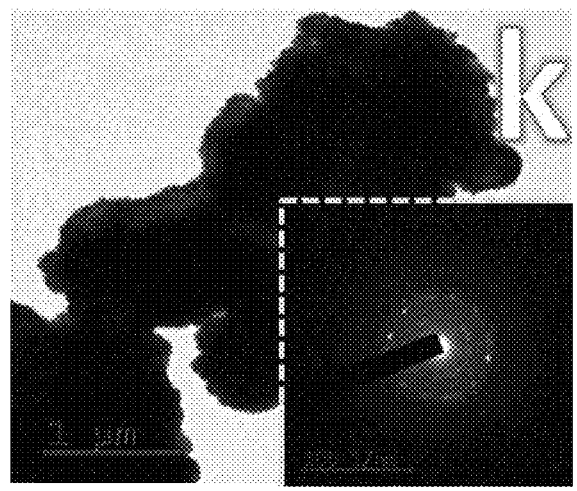
FIG. 7K shows TEM (Inset shows SAED pattern for the FeSe sample).
Figure 7L:
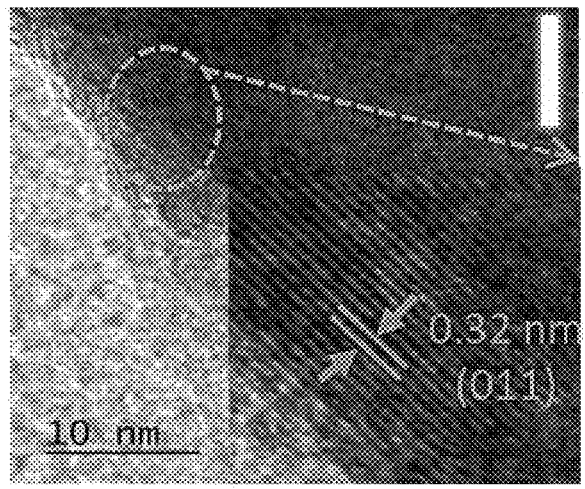
FIG. 7L shows HRTEM images for the NiCuSe$^{-6}$ sample.
Figure 7M:
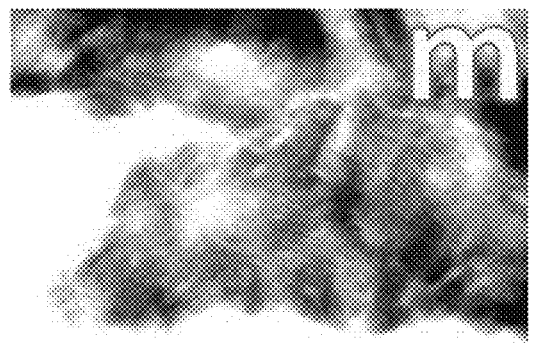
FIG. 7M shows electron area.
Figure 7N:
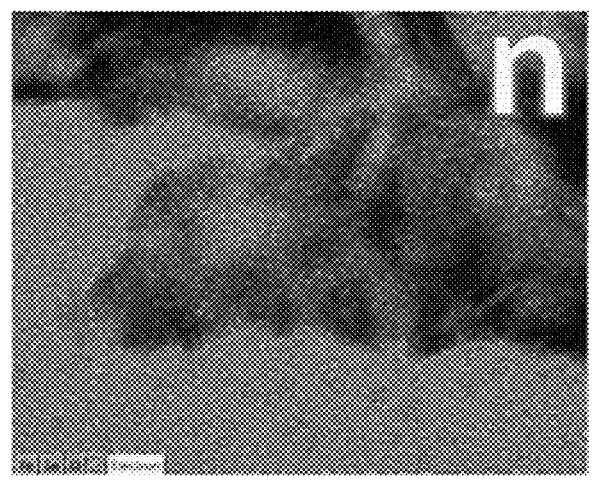
FIGS. 7N-7P shows EDS elemental mapping images for FeSe sample.
Figure 7O:
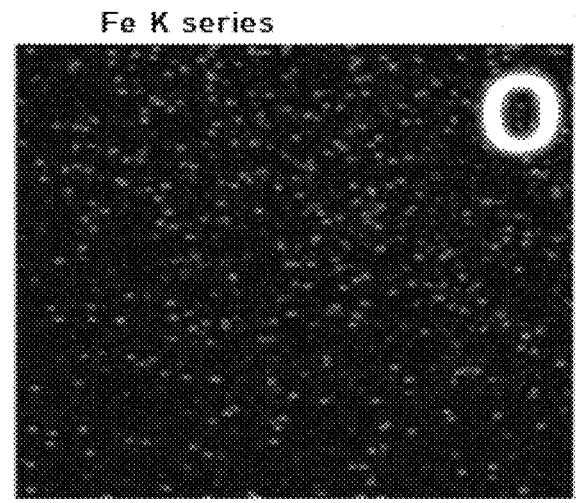
Figure 7P:
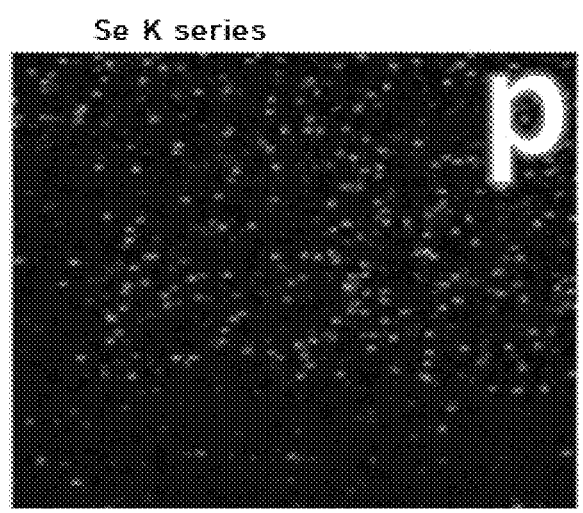

Recently, iron-based materials are revealed as high-performance negative electrode materials for HSCs. Therefore, in present study we designed and develop iron selenide (FeSe) nanoparticles as an intriguing negative electrode material. The typical SEM images of FeSe sample at two different magnifications are shown in FIGS. 7I and 7J. The low-magnification SEM image (FIG. 7I) reveals nanoparticles composed arrays which are consistently deposited over the entire surface of CF substrate. The high magnification image (FIG. 7J) reveals nanoparticles having diameter of 20-30 nm. The nanoparticles composed surface provide very high surface area which is advantageous for enhancing electrochemical features. The TEM image (FIG. 7K) for FeSe sample further reveals its nanoparticles structure which is densely packed. Plenty of nanoparticles of FeSe are accumulated on the surface of CF. The SAED pattern for the FeSe nanoparticles illustrated in inset of FIG. 7K indicates well polycrystalline structure. Moreover, HRTEM image in FIG. 7L proves the clear lattice fringes with interplanar spacings of 0.32 nm, equivalent to the (011) plane of tetragonal FeSe. The electron image (FIG. 7M) and elemental mapping images demonstrated in FIGS. 7N to 7P confirms the presence of Fe and Se elements. Besides all the elements are homogeneously distributed in the whole nanostructure.

Figure 8A:
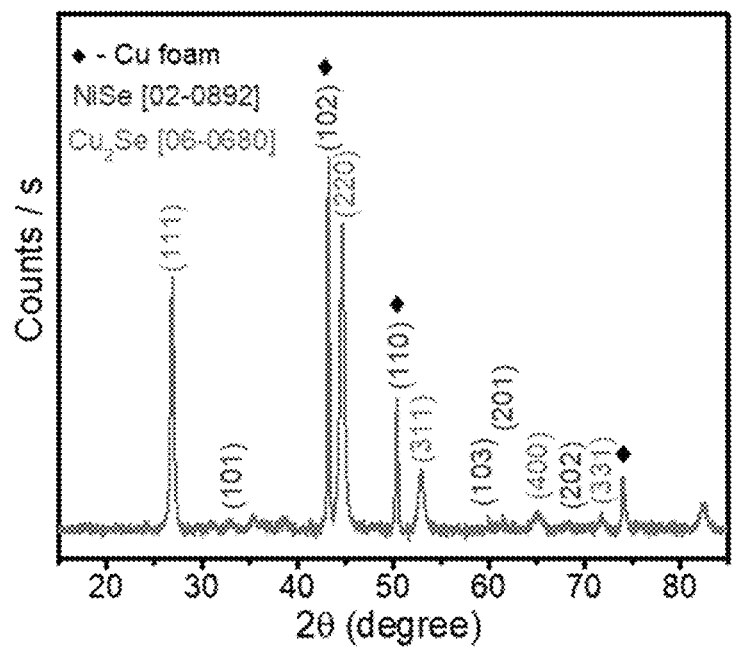
FIGS. 8A and 8B shows XRD pattern for NiCuSe and FeSe, respectively.
Figure 8B:
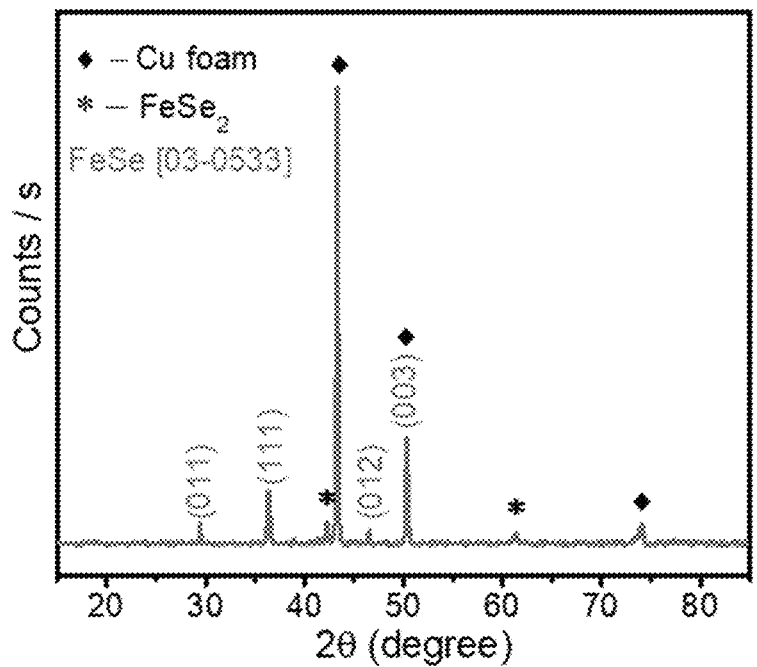
Figure 8C:
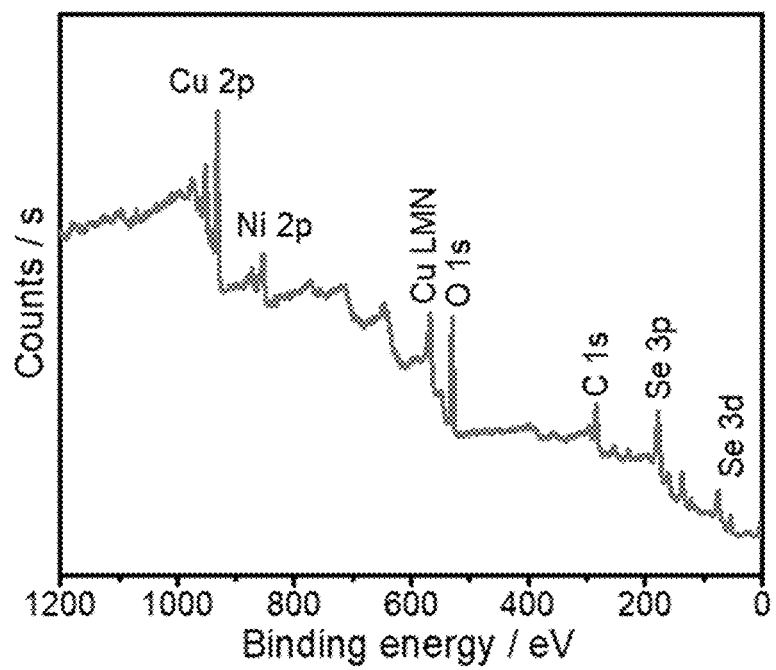
FIGS. 8C and 8D shows XPS survey scan spectra for NiCuSe and FeSe, respectively.
Figure 8D:
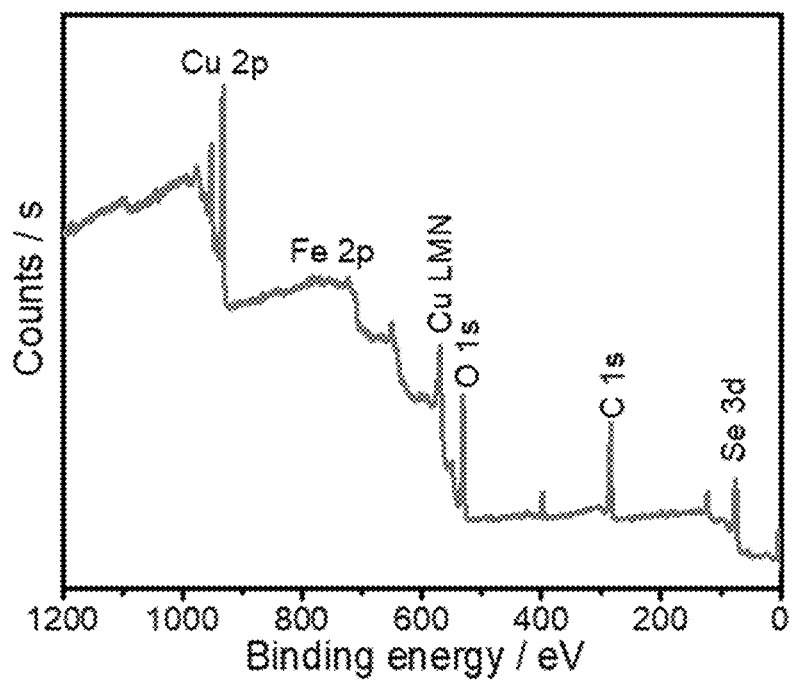
Figure 9A:
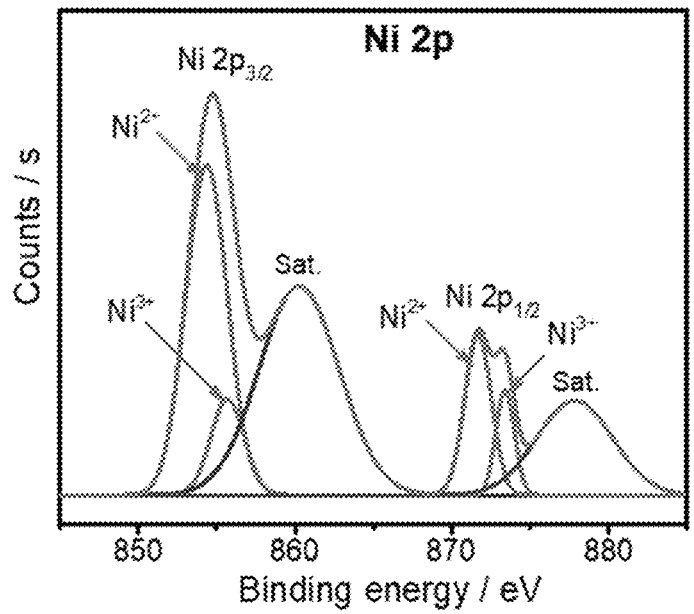
FIG. 9A shows XPS narrow scan spectrum for Ni 2p, FIG. 9B for Cu 2p and FIG. 9C for Se 3d of NiCuSe.
Figure 9B:
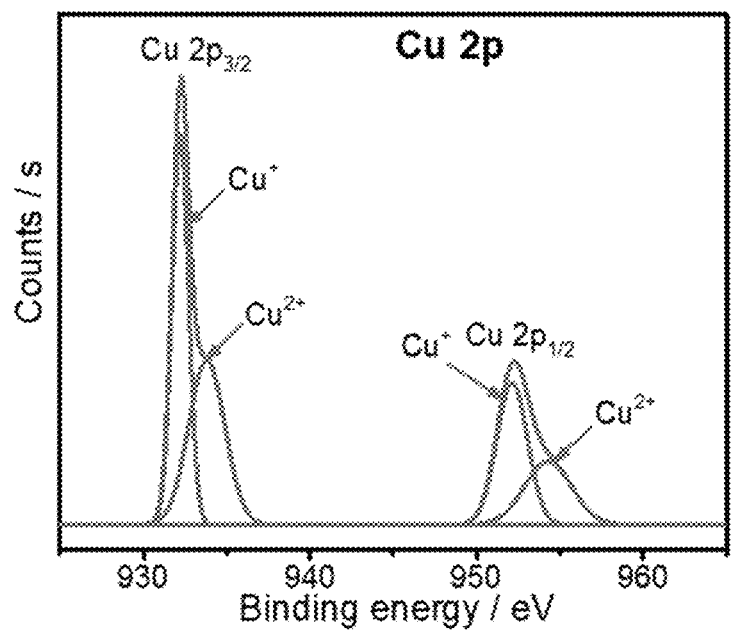
FIG. 9D shows XPS narrow scan spectrum for Fe 2p, and FIG. 9E for Se 3d of FeSe.
Figure 9C:
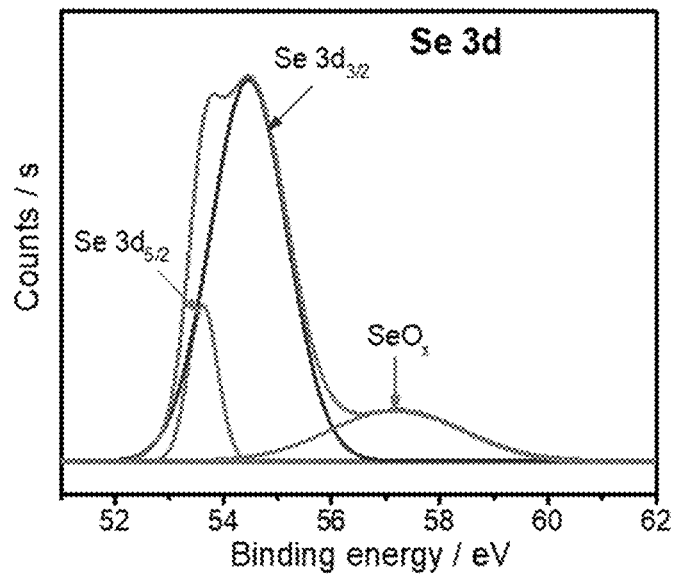
Figure 9D:
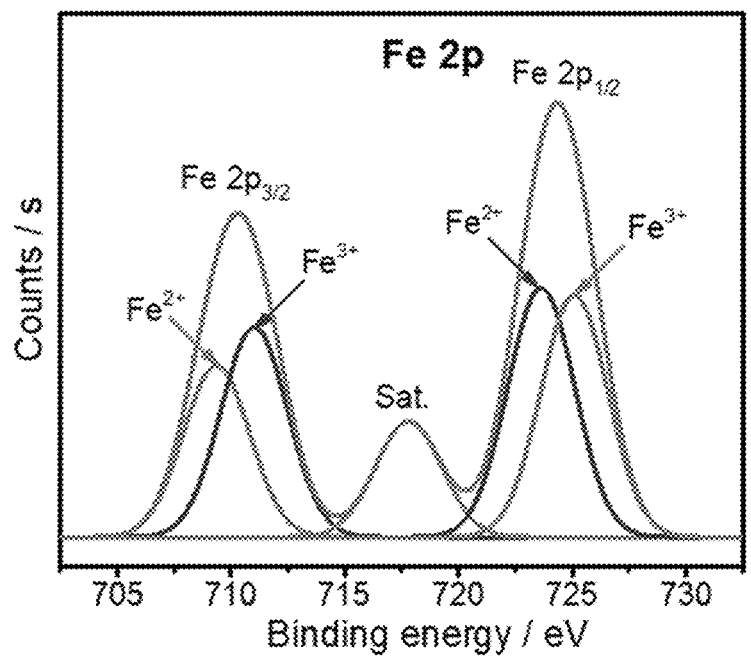
Figure 9E:
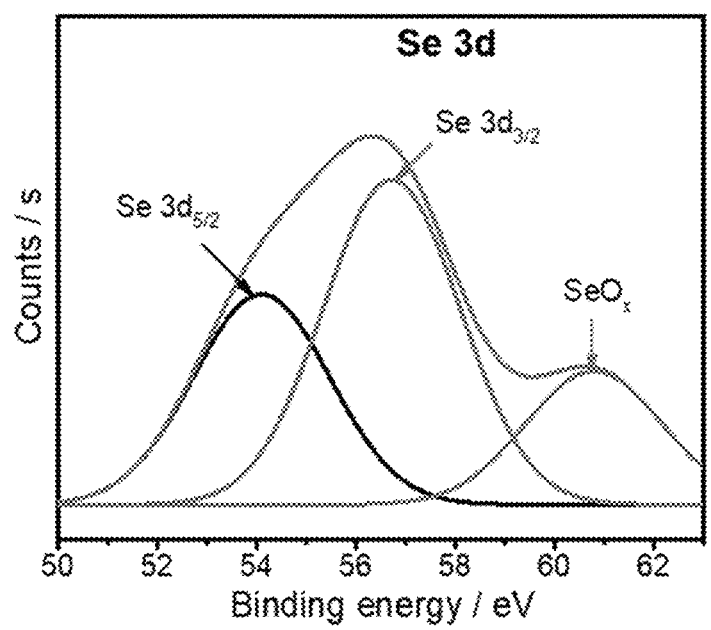

After selenization, the crystallographic phase of the obtained material was characterized from the XRD analysis. FIG. 8A shows the XRD pattern for the NiCuSe sample. All the diffraction peaks are well matched to the hexagonal NiSe phase (JCPDS no. 02-0892) and cubic Cu2Se (JCPDS no. 06-0680) phase. Interestingly, no additional peaks corresponding to the other phases were seen. The lower intensity peaks for the hexagonal NiSe indicates that the in-situ formed phase is slight amorphous in nature. The XRD pattern for the FeSe nanoparticle arrays displayed in FIG. 8B, indexed to the tetragonal FeSe phase (JCPDS: 03-0533). Some additional peaks corresponding to the orthorhombic ferroselite FeSe2 phase (JCPDS 21-0432) are also observed. Thus, the XRD result clearly confirms the formation of iron selenides with mixed crystal structures. Further, X-ray photoelectron spectroscopy (XPS) analysis were executed for the clear understanding of the composition and chemical characteristics of elements in the obtained sample. From the broad range scan spectrum presented in FIG. 8C, the collaboration of Cu, Ni and Se alongside with 0 elements were identified. Notably, the peak designated for 0 is expected to the contact of sample with air and subsequent adsorption on the surface. FIGS. 9A-C represents the core level XPS spectra for elements in NiCuSe and FeSe samples. As illustrated in FIG. 9A, Ni 2p spectrum was deconvoluted into two spin-orbit doublet and shakeup satellite peaks. The peaks at 854.4 and 871.7 eV, corresponding to the Ni2+ state present in the NiCuSe, while the peaks at 855.7 and 873.4 eV resemble to the Ni3+ state in the NiCuSe. The satellite peaks are observed at 860.2 eV in the Ni 2p3/2 and at 877.8 in Ni 2p1/2 species, respectively. In Cu 2p XPS spectrum (FIG. 9B), peaks at 932.3 and 952.2 eV corresponds to the Cu+ (Cu—Se) state in the NiCuSe. Similarly, the peaks at 933.8 and 954.3 eV confirms the formation of Cu2+ (Cu—O) species. The appearance of Cu2+ state is related to the superficial oxidation of NiCuSe in the ambient environment.

The above observation clearly interpret that the proposed synthesis procedure leads to the formation of metal selenides. Further, FIG. 9C indicates the narrow scan XPS spectrum of Se 3d. The peak located at 53.6 and 54.8 eV are the metalselenide bonds of the Se 3d5/2 and Se 3d3/2, which confirms the presence of selenium as Se2– state in NiCuSe sample. Additionally, the broad peak at 57.2 eV indicates the partially oxidized SeOx species. The above-mentioned XPS results evidently proves the effective conversion of Ni(OH)2@Cu(OH)2 and creation of NiSe and Cu2Se phases. Notably, the multiple chemical states of the elements in NiCuSe sample enable rich redox chemistry to provide higher electrochemical performance. The XPS survey scan spectrum in FIG. 8D, confirms the presence of Fe, Se, C, O and Cu elements. The core level XPS spectrum of Fe 2p in FIG. 9D, was split into two spin-orbit doublets consequent to Fe 2p3/2 and Fe 2p1/2 species and one satellite peak. The peaks at 709.4 and 723.6 eV are dispensed to the Fe2+ state present in the FeSe nanoparticle arrays, whereas the peaks at 711.0 and 725.1 eV are allocated to the Fe3+ state. The satellite peak of Fe 2p is observed at 717.8 eV. The Se 3d XPS spectrum FIG. 9E, displays chief peaks located at 54.01 and 56.7 eV assigned to the Se 3d5/2 and Se 3d3/2 species, respectively, reliable with the iron selenides (FeSe and FeSe2). Additionally, the peak corresponding to the SeOx is observed at 60.7 eV, reveals the formation of SeOx impurities during the selenization process.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A hybrid super-capacitor (HSC) cell comprising:
   a negative electrode made up of FeSe nanoparticles;
   a positive electrode made up of rose-nanopetals; and
   a copper foam;
   wherein the negative electrode and positive electrode are directly anchored on the copper foam via in-situ conversion reactions.

2. The hybrid super-capacitor (HSC) cell of claim 1, wherein the rose-nanopetals are NiCuSe rosepetal structures.

3. The hybrid super-capacitor (HSC) cell of claim 1, wherein the hybrid super-capacitor (HSC) cell has an operating potential window of 1.6 V.

4. The hybrid super-capacitor (HSC) cell of claim 1, wherein the hybrid super-capacitor (HSC) cell has a specific energy of 87.6 Wh kg−1 at a specific power of 914.3 W kg−1.

5. The hybrid super-capacitor (HSC) cell of claim 1, wherein the hybrid super-capacitor (HSC) cell has cycle lifetime with capacity retention of 91.3% over 10,000 cycles with 99% of columbic efficiency.

6. The hybrid super-capacitor (HSC) cell of claim 1, wherein the hybrid super-capacitor (HSC) cell has an operating temperature range of −25 to 65° C.

7. The hybrid super-capacitor (HSC) cell of claim 1, wherein the hybrid super-capacitor (HSC) cell has specific capacity of 534.2 mA h g$^{-1}$ for NiCuSe and 573.8 mA h g$^{-1}$ for FeSe at current density of 1 A g$^{-1}$, respectively.

8. The hybrid super-capacitor (HSC) cell of claim 1, wherein the copper form is a 3D structure and is highly conductive.

9. The hybrid super-capacitor (HSC) cell of claim 1, wherein size of the copper foam is 2*2 cm.

10. A method of manufacturing a hybrid super-capacitor (HSC) cell, the method comprising the steps of:
    preparing a PVA-KOH gel electrolyte by mixing KOH and PVA powder;
    assembling solid-state NiCuSe//FeSe6 ASCs, by soaking a positive and a negative electrode in the gel electrolyte and then drying under vacuum, the negative electrode being made up of FeSe nanoparticles and the positive electrode being made up of rose-nanopetals; and
    directly anchoring the negative electrode and positive electrode on a copper foam via in-situ conversion reactions.

11. The method of claim 10, wherein preparing the PVA-KOH gel electrolyte is done by mixing 2 M KOH and 2 gm of PVA powder in the 30 ml deionised water at 80° C. with continuous stirring.

12. A method of manufacturing the NiCuSe rose-petal structures in accordance with claim 10, the method further comprising the steps of:
    cleaning the copper foam with deionized water, ethanol and acetone;
    oxidizing the cleaned copper foam in an etching solution containing a mixture of NaOH and (NH4)2S2O8;
    allowing the oxidized copper foam to dry in a vacuum oven;
    preparing a growth solution and inserting the dried and oxidized copper foam; and
    conducting selenization of Ni(OH)2@Cu(OH)2 nanowires.

* * * * *